(12) United States Patent
Chan

(10) Patent No.: US 6,910,499 B2
(45) Date of Patent: Jun. 28, 2005

(54) VALVE ASSEMBLY FOR PRESSURIZED FLUID VESSEL

(75) Inventor: Yet Chan, Hong Kong (HK)

(73) Assignee: Foster Wheeler Corporation, Wanchai (HK)

( * ) Notice: Subject to any disclaimer, the term of this patent is extended or adjusted under 35 U.S.C. 154(b) by 0 days.

(21) Appl. No.: 10/657,592

(22) Filed: Sep. 8, 2003

(65) Prior Publication Data

US 2005/0051214 A1 Mar. 10, 2005

(51) Int. Cl.$^7$ .............................................. F16K 31/34
(52) U.S. Cl. ....................... 137/413; 137/430; 137/446; 141/198
(58) Field of Search .............................. 137/413, 414, 137/430, 443, 446; 141/198

(56) References Cited

U.S. PATENT DOCUMENTS

| | | | | |
|---|---|---|---|---|
| 643,906 A | * | 2/1900 | Mrash .......................... | 137/413 |
| 2,731,030 A | * | 1/1956 | Phillips et al. .............. | 137/413 |
| 2,851,055 A | * | 9/1958 | Mosher ........................ | 137/413 |
| 3,625,264 A | * | 12/1971 | Swain ........................... | 141/198 |
| 4,013,091 A | * | 3/1977 | Hudson ........................ | 137/433 |
| 4,313,459 A | * | 2/1982 | Mylander ..................... | 137/433 |
| 5,487,404 A | * | 1/1996 | Kerger ........................ | 137/413 |
| 5,832,953 A | * | 11/1998 | Lattner et al. ............... | 137/413 |
| 6,035,888 A | * | 3/2000 | Gil .............................. | 137/413 |
| 6,076,546 A | * | 6/2000 | Waters ........................ | 137/390 |
| 6,178,994 B1 | * | 1/2001 | Park ............................ | 137/413 |
| 6,293,302 B1 | * | 9/2001 | Waters et al. ............... | 137/446 |
| 6,408,869 B1 | * | 6/2002 | Bartos et al. ............... | 141/198 |

* cited by examiner

Primary Examiner—Kevin Lee
(74) Attorney, Agent, or Firm—Brooks Kushman P.C.

(57) ABSTRACT

A valve assembly for a pressurized fluid vessel such as a propane tank has a housing defining a main fluid passageway therebetween with a valve seat (734) defined in the main passageway, a main valve member (742) movable against the valve seat (734) to block the passageway, an insert (738) defining an internal chamber within the interior of the housing within which the main valve member (742) is disposed, a secondary fluid flow passageway through the insert (738), through a conduit (748) connected to the main valve body, and through openings (751) in an end of the conduit (748) facing second ports opening into the vessel, and a secondary valve member (760) movable to block the openings (751) under the action of a float (721) on a predetermined fluid level being reached, thereby exposing the main valve member (742) to a pressure differential to close the valve.

55 Claims, 18 Drawing Sheets

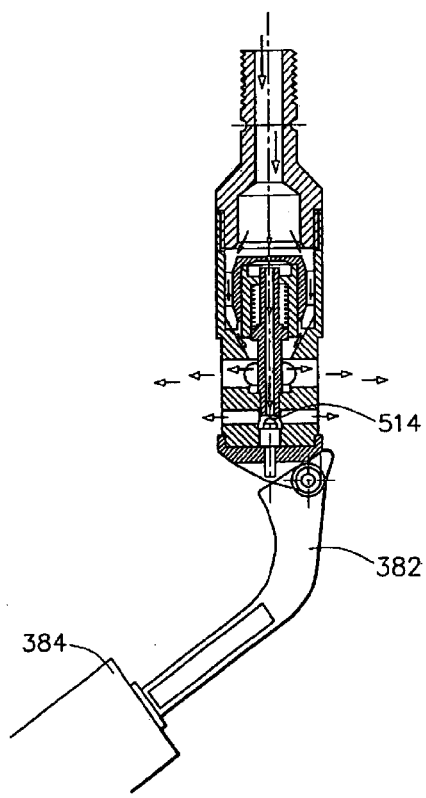
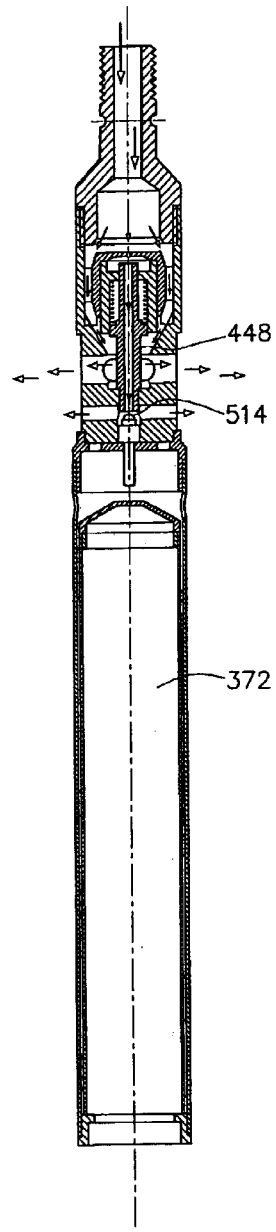
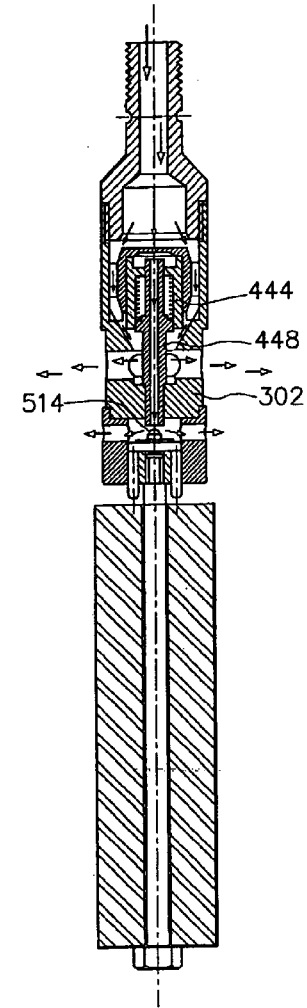
FIGURE 23
FIGURE 22
FIGURE 21

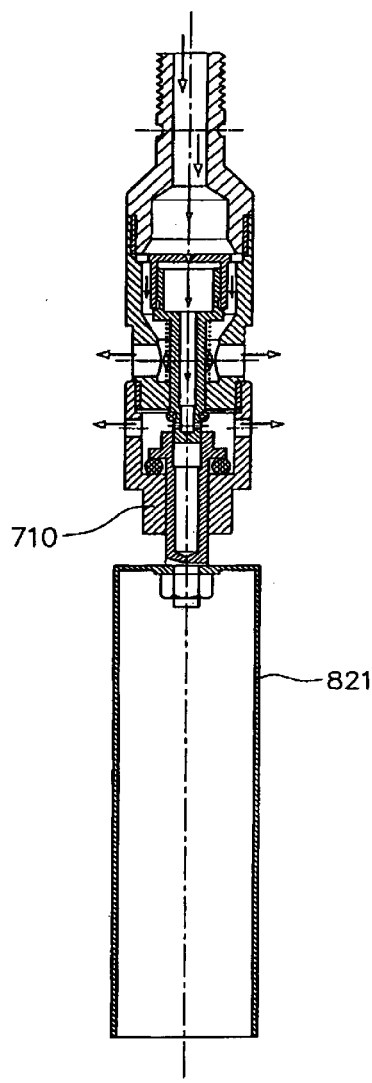
FIGURE 30
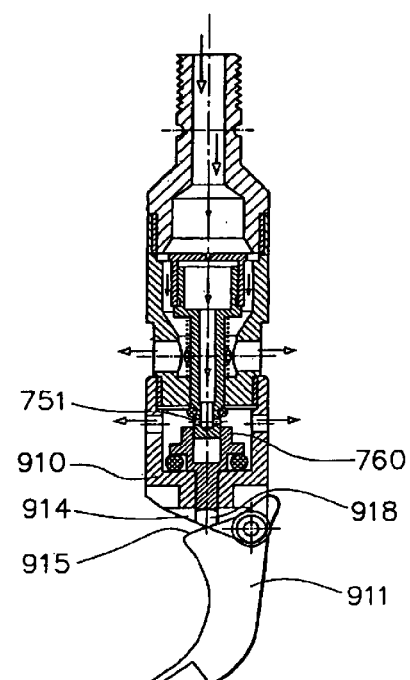
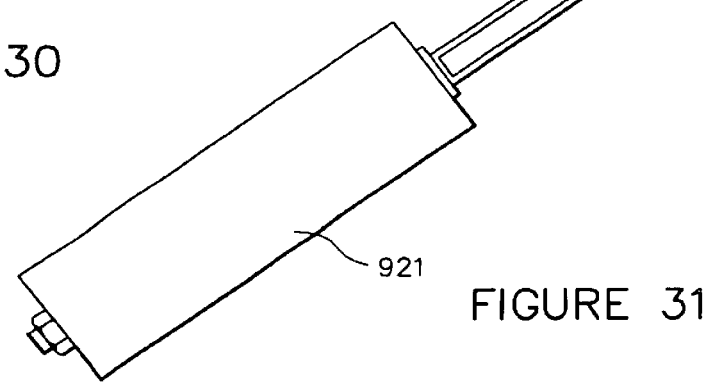
FIGURE 31

VALVE ASSEMBLY FOR PRESSURIZED FLUID VESSEL

BACKGROUND OF INVENTION

The invention relates to valve assemblies for pressurized fluid vessels. More particularly, the invention relates to valve assemblies for controlling the filling of such pressurized fluid vessels.

Various valve assemblies constructed to avoid overfilling of pressurized fluid vessels are known. In U.S. Pat. No. 5,282,496 there is disclosed a two-way valve for filling and draining a gas cylinder. The valve assembly includes a float assembly for control of the opening and closing of the valve as a function of the fluid level in the tank so that the valve can be closed when the fluid level corresponds to the predetermined safe capacity of the vessel. However, this traditional valve design directs the incoming fluid jets in the general direction of the float, causing the float and the associated valve control to be disrupted from its normal movement, giving false signals and possible premature closing of the valve before filling is complete.

U.S. Pat. No. 6,076,546 discloses an overflow protection valve assembly in which the valve plunger is separated from the fluid flow to prevent premature closing due to the pressure on the valve plunger. However, fluctuations in the fluid level during filling are translated to the float assembly. The valve plunger is thereby affected by the control link to this fluctuating float as it moves up and down in the volatile fluid level, and can prematurely close.

The present invention seeks to provide an improved valve assembly which provides positive, reliable closure and yet is of simply overall construction.

SUMMARY OF THE INVENTION

According to the invention there is provided a valve assembly for a pressurized fluid vessel comprising: a housing having a fluid inlet for connection, on filling, to a source of pressured fluid and a fluid outlet opening into the vessel, and defining a main fluid passageway therebetween; a main valve seat defined in said main fluid passageway; a main valve member movable against said valve seat to block the main fluid passageway; means defining a secondary fluid passageway from said main fluid passageway arranged so that an upstream side of the main valve member is exposed to fluid in the secondary fluid passageway; means defining an internal chamber within the interior of the housing within which an upstream side of the main valve member is disposed, a secondary fluid passageway; secondary valve means comprising a secondary valve seat and a secondary valve member arranged in said secondary fluid passageway movable to block the second fluid passageway; control means responsive to a fluid level arranged to act on the secondary valve member to move this to a position on a predetermined vessel fluid level being reached in which the main valve member is exposed to a pressure differential to force the main valve member to contact the valve seat.

The means defining the secondary fluid passageway may include chamber-defining means defining an internal chamber within the interior of the housing within which the upstream side of the main valve member is disposed.

The use of a secondary valve arranged in this way to control the main valve member ensures the rapid and very effective sealing of the main valve with a simple structural arrangement, utilizing pressure to catch the main valve, with the pressurized fluid serving to force the main valve member against the seat.

In one version, the chamber defining means may define an opening from the main fluid passageway into the internal chamber which is closed by the secondary valve, said control means opening secondary valve to expose the upstream side of the main valve member to pressurized fluid on the predetermined vessel fluid level being reached.

In one preferred embodiment the chamber-defining means comprises a hollow body defining a lower cavity region within which the main valve member is slidingly received and an upper cavity region in which the secondary valve member is disposed. The hollow body may conveniently comprise an insert disposed within the housing and spaced therefrom by a plurality of ribs, and the exterior of the body defining with an interior surface within the housing the main fluid passageway.

The valve member may be generally in the form of an upturned cup having an upper face disposed within the chamber-defining member and exposed to pressurized fluid on opening of the secondary valve, and a depending skirt at least a lower region of which protrudes from the chamber-defining member into the main fluid passageway in the closed position.

The control means may comprise a control pin having an end region protruding from the valve assembly, in use acted on by float means, and an opposite end region to which said secondary valve member is connected. A return spring is provided to urge the main valve member into the open position spaced from the main valve seat, preferably arranged between an underside of the upper region of the valve member and a spring seat provided on the control pin.

In one particular embodiment the opening of the secondary valve is disposed at an upper region of the chamber-defining means directly facing said housing inlet, and the secondary valve member is disposed within opening to be movable upstream thereof, whereby the force of infilling pressurized fluid forces the secondary valve member into the opening.

In alternative versions a secondary fluid passageway is further defined extending from said internal chamber to a fluid outlet opening into the vessel, said secondary valve means being disposed in said secondary fluid passage between the internal chamber and the fluid outlet to block said secondary fluid passageway on the control means responding to said predetermined vessel fluid level.

In one such form the secondary fluid passageway may be in part defined in a conduit integrally connected to said main valve member.

In a different variation the secondary fluid passageway is defined in a conduit arranged fixed within the housing the main valve member having an inverted cup-like form and an opening therein through which the conduit extends whereby the main valve member is slidable over the conduit. The conduit will extend to a secondary exit chamber from which fluid exits the assembly via one or more further ports. The secondary valve means then comprises a needle valve having a needle-like member supported on the control means which is receivable within a valve seat within said conduit.

With these versions the chamber defining means comprises an inverted cup-like hollow body defining an opening in the upper surface into said main fluid passageway. The main valve member may comprise a cup-like member slidingly disposed within the mouth of the inverted cup-like body with a lower periphery extending into said main fluid passageway and abutting the valve seat in the closed position, and a return spring may be provided between an underside of the main valve member and a spring seat within the housing, urging the main valve to the open position.

In a further version the chamber-defining means defines an enclosure having an upper portion of reduced lateral dimension defining an opening into the main fluid passageway and below this a portion of enlarged lateral dimension within which the main valve member is disposed. The secondary flow path may be further defined in a conduit which extends from said upper portion and which includes an outlet or outlets adjacent the upper side of the main valve members, and more particularly extending through the valve member, and is joined thereto or formed unitarily therewith. The valve member may have a depending skirt portion which abuts the valve seat in the closed position.

In an alternative, the conduit is fixed within the housing, the valve member defining an opening through which the conduit extends, whereby the main valve member is slidable over the conduit.

It may also be arranged that the upper end of the conduit is formed with screw means for screwing into a complementary female screw thread within said upper portion.

The control means may comprise a secondary valve support member which carries the secondary valve member, the support member being slidingly mounted near a lower end of the housing and to which is connected float means which urges the valve support member upwardly as the vessel fluid level rises, the secondary valve support being downwardly biased by further spring means.

The control means may be controlled by a float member supported on the valve assembly. This may be of elongate form disposed in a vertical orientation and mounted to allow vertical displacement.

Alternatively the float may be mounted on a pivoting arm so as to pivot between a generally vertical orientation in an empty condition of the vessel and a horizontal or inclined orientation in a full condition of the vessel, the pivoting arm having an actuating surface which engages the control means on filling.

In a further aspect the invention resides in a valve assembly for a pressurized fluid vessel comprising: a housing having a fluid inlet for connection, on filling, to a source of pressured fluid and a fluid outlet opening into the vessel, and defining a main fluid passageway therebetween; a main valve seat defined in said main fluid passageway; a main valve member movable against said valve seat to block the main fluid passageway; means defining a secondary fluid passageway from said main fluid passageway arranged so that an upstream side of the main valve member is exposed to fluid in the secondary fluid passageway; secondary valve means comprising a secondary valve seat and a secondary valve member arranged in said secondary fluid passageway movable to block the secondary fluid passageway; control means responsive to a fluid level arranged to act on the secondary valve member to block the secondary fluid passageway on a predetermined vessel fluid level being reached to thereby expose the main valve member to a pressure differential forcing it against the valve seat.

In a preferred embodiment the said means defining the secondary fluid passageway includes a body defining an opening therein communicating with said main passageway and further defining with said main valve member or with means connected to said main valve member an internal chamber. The body defining the opening therein has the form of an inverted cup, with said main valve member having a cup-like form with an upper edge slidingly received within said body. The conduit depends from said main valve member communicating with said internal chamber and constituting part of said second passageway.

The conduit has at least one opening at a lower region thereof constituting said secondary valve opening.

The control means includes a sleeve portion which overlies the lower region of the conduit and is movable to block said opening or openings. A sealing ring may be provided about the conduit above the said opening or openings against which an end of the sleeve abuts when the valve is closed. Resilient means may be provided against which an adaptation on the conduit bears when the valve is in the closed position, providing an upward force on the sleeve to force it tightly against the sealing ring. Such means may for example comprise a silicone rubber O-ring.

It may be deliberately arranged that there is a small clearance between the sleeve portion and conduit whereby even when closed a small amount of fluid leakage is allowed. This provides a degree of pressure relief within the valve reducing back pressure valve closure.

BRIEF DESCRIPTION OF THE DRAWINGS

A detailed description of embodiments of the invention, with various preferred structure, is set forth below by way of example only, with reference to the accompanying drawings, in which:

FIG. 19 is a partial sectional side view of a further exemplary valve assembly according to an eleventh embodiment of the invention, with the valve assembly open;

FIG. 21 is a partial sectional side view of a further exemplary valve assembly according to a thirteenth embodiment of the invention, with the valve assembly open;

FIG. 22 is a partial sectional side view of a further exemplary valve assembly according to a fourteenth embodiment of the invention, with the valve assembly open;

FIG. 23 is a partial sectional side view of a further exemplary valve assembly according to a fifteenth embodiment of the invention, with the valve assembly open;

FIG. 30 is a partial sectional side view of a further exemplary valve assembly according to a nineteenth embodiment of the invention, with the valve assembly open;

FIG. 31 is a partial sectional side view of a further exemplary valve assembly according to a twentieth embodiment of the invention, with the valve assembly open.

DETAILED DESCRIPTION OF PREFERRED EMBODIMENTS

The invention is directed to a valve assembly for use in a pressurized fluid vessel. The valve assembly is a two-way type and provides reliable filling of pressurized fluid into the vessel and unloading of the fluid from the vessel through essentially the same fluid flow path, controlled by a valve plunger. Preferred embodiments of the invention are described in the context of an application to a consumer propane tank. It should be understood that the principles of the invention are also applicable to other pressurized vessel environments in which control of the filling level is desired or required.

Figure 1:
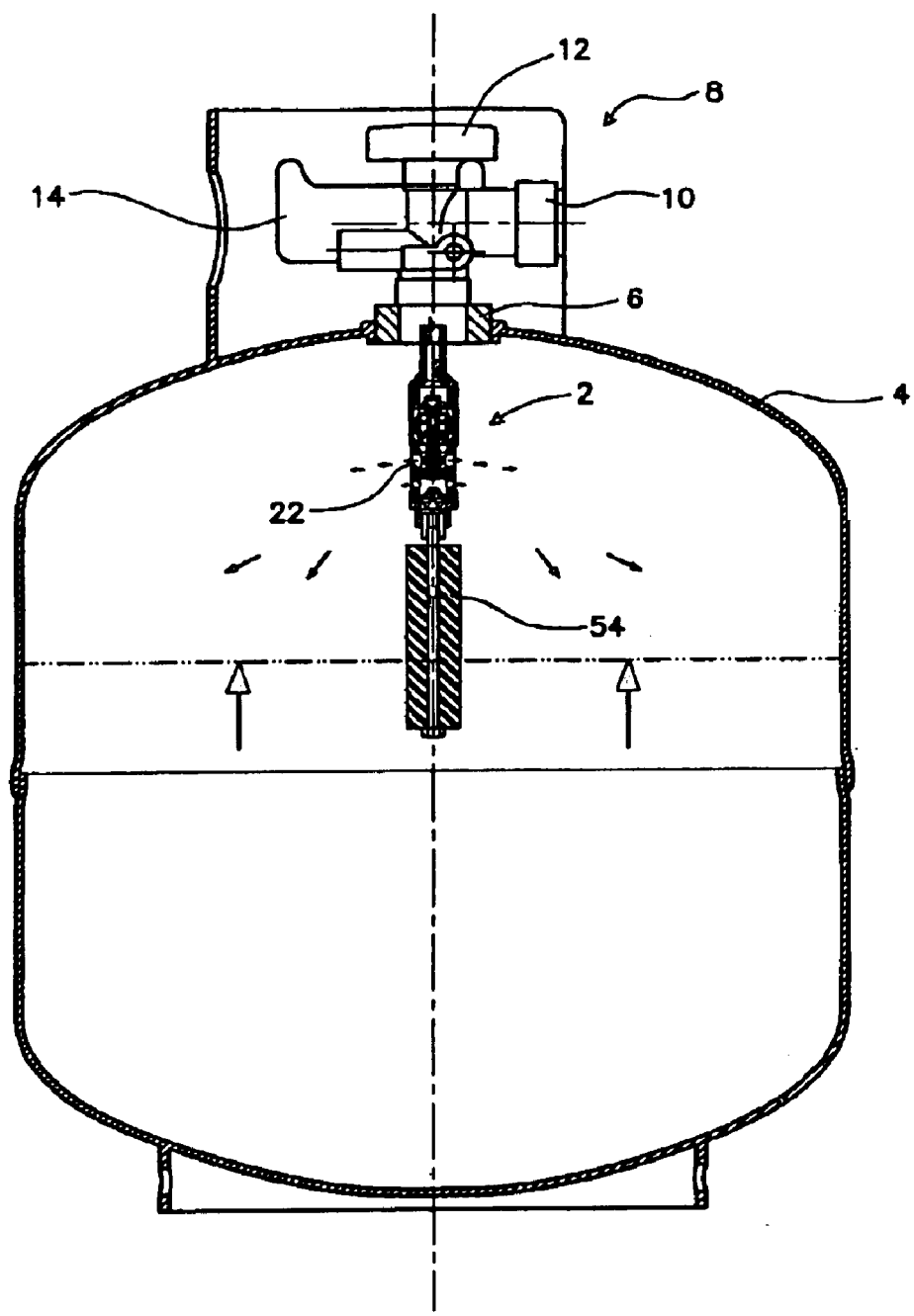
FIG. 1 is a side view of a valve assembly embodiment according to aspects of the invention shown in the interior of a pressurized fluid vessel.

Referring to FIG. 1, a valve assembly 2 can be installed in a pressurized fluid vessel, such as a consumer propane tank 4. The propane tank 4 includes an opening 6 to which an external valve 8 is secured. The external valve 8 has a port 10 through which pressurized fluid, such as propane, can be supplied to the vessel and through which the fluid can be dispensed for fuelling a propane barbecue grill or other appliance (not shown). Opening and closing of the port can be controlled manually by turning a handle 12, which controls a shut-off valve assembly, not shown but well-known in the art. The external valve 8 can provide a safety valve port 14 for the release of pressurized fluid at a predetermined pressure level, which may be exceeded, for example, if the vessel 4 is overheated.

The external valve 8 can mount to the vessel 4 by a threaded engagement with the opening 6. The external valve 8 can also provide an interior threaded connection for securing to a threaded stem 27 of the valve assembly 2. In use, pressurized fluid passes through an upper port 20 in the valve assembly 2 and flows through lower ports 22 laterally to and from the valve assembly 2 inside the vessel 4.

The valve assembly comprises a main housing having upper and lower housing parts 24, 26 respectively. The upper housing part 24 defines the upper threaded stem 27 and defines the upper port 20. A lower portion defines a male thread 32.

The lower housing part 26 has an elongate form which defines an internal cylindrical opening which includes a frustoconical surface which forms a valve seat 34 communicating with a series of radial ports 22. An upper rim is internally provided with a female thread 36 whereby upper and lower housing parts can be tightly connected by a screw fit. An axial bore is provided in the lower region of the lower housing part 26 through which a control member 28 extends.

Disposed within the cylindrical interior cavity of the lower housing part 26 is an insert 38 which has the shape of an inverted cup and which functions as a flow diverter. Its exterior is provided with a number of ribs 40 which serve to space the insert 38 from the interior surface of a main internal cavity of the housing part 6 and defining fluid flow paths therebetween.

Figure 2:
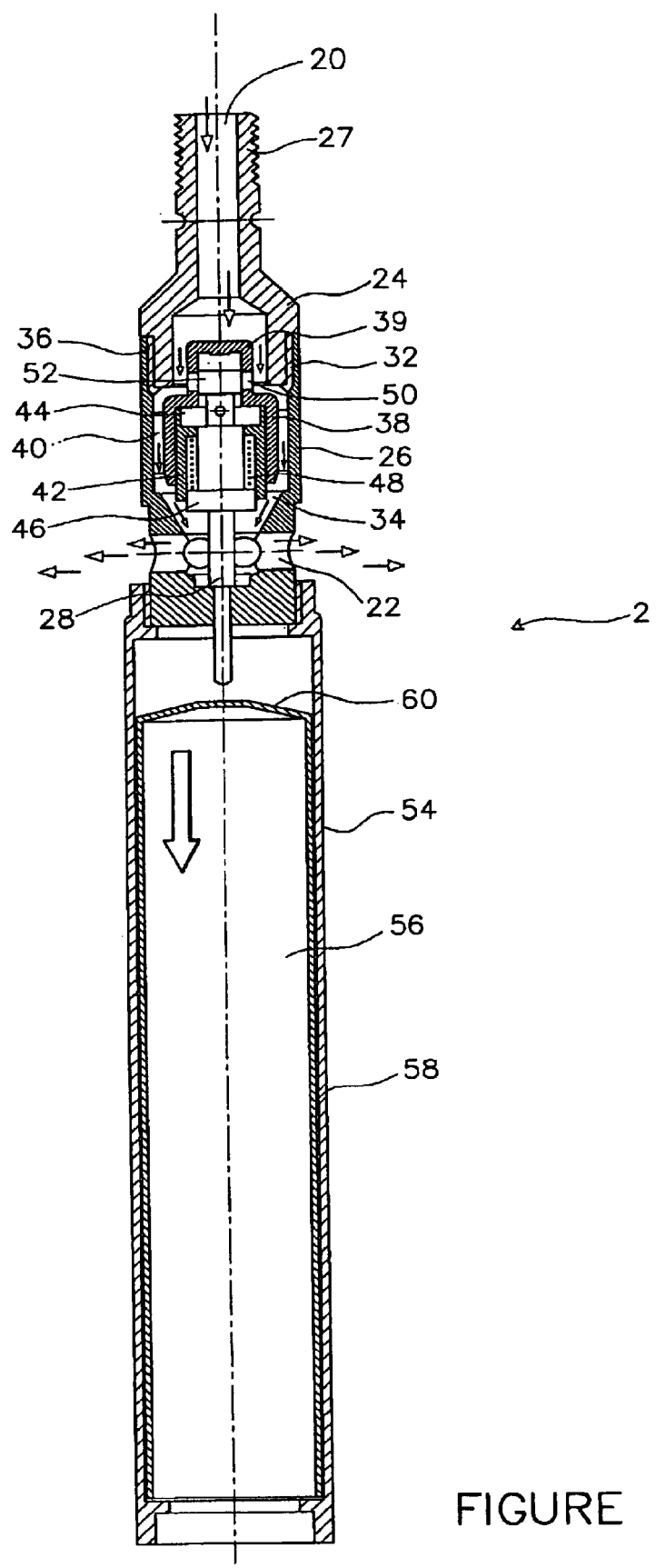
FIG. 2 is a partial sectional side view of the exemplary valve assembly according to a first embodiment of the invention in the open position.

Arranged within the insert 38 is an inverted cup-like main valve body 42 which sits within the insert for sliding movement relative thereto. A lower edge of the valve body 42 is arranged to be able to contact the frustoconical valve seat 34 to block passage of pressurized fluid into the tank in a manner discussed further below. As can be seen in FIG. 2 this lower edge protrudes from the bottom of the insert 38. An upwardly extending upper rim 44 of the valve body 42 serves as a step limiting the upward movement of the valve body 42, the rim abutting a shoulder or step-like region provided adjacent a cap-like protrusion 39 formed at the top or upstream (in the sense of liquid filling) end.

The control member 28 extends axially through an axial opening within the top of the valve body 42. A central shoulder 46 is formed in the region at the lower mouth of the valve body with a spring 48 disposed between the upper face of the shoulder 46 and the underside of the top of the valve body. The spring 48 thereby urges the valve body 42 upwardly, the position shown in FIG. 2 being the uppermost valve position where the rim 44 abuts the shoulder of the insert 38, and where there is a defined clearance between the lower edge of the valve body and the valve seat 34.

The upper protrusion 39 of the insert 28 provides a secondary valve, the protrusion defining a small chamber with which one or more ports 50 communicate. A secondary valve head 52 is formed as an upward extension of the control member 28. In the open position of the main valve body the secondary valve is in a closed position with the valve head 52 obscuring the port(s) 50.

At the lower end of the lower housing part 26 there is arranged a float assembly 54 comprising a sealed float member 56 disposed within a support 58 which is adapted to expose the float member 56 to the fluid. An upper end 60 of the float member acts on a lower end of the control pin or member 28 which is protruding through the opening in the lower housing part 26.

The operation of the valve assembly 2 will now be discussed. In an empty or near empty condition of the tank the float 56 will be in its lowermost position as indicated in FIG. 2, with its upper surface 60 preferably spaced from the lower end of the control member 28. In this condition the valve member 42 is urged to its upper position by the spring 48, providing a main fluid flow path from the inlet port 20 around the exterior of the diverter 38 over the valve seat 34 and into the tank via the radial openings 22. Thus, if an external source of pressurized fluid such as propane is connected to the external valve assembly 8 through its port 10 and opened by turning the handle 12, pressurized propane will flow through the valve assembly 2 in the manner as described.

Figure 3:
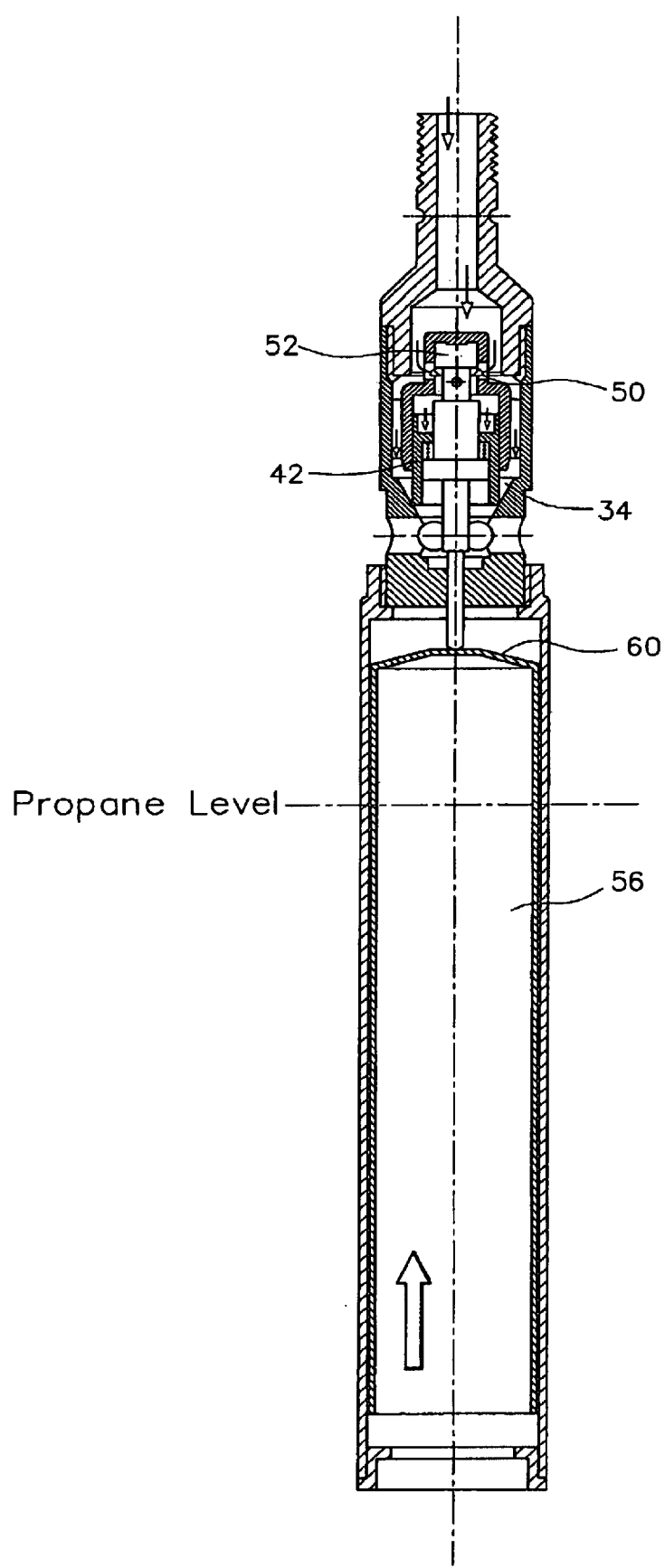
FIG. 3 is a partial sectional side view of the valve assembly of FIG. 2 in the closed position.

As the tank fills a portion of the pressurized fluid will be in a liquid state and create a liquid pool in the tank of rising level. The level of this liquid pool raises the float 56 which at a predetermined level bears on the control member 28 forcing this upwardly against the force of the spring 48. As shown in FIG. 3, as the control member 28 moves upwardly the secondary valve becomes opened with the secondary valve member 52 clearing the openings 50. As this occurs an alternative flow path for the pressurized fluid is rapidly opened, the fluid entering the openings 50 and impinging on the upper surface of the valve member 42 creating a pressure differential across the valve member 42 forcing this downwards against the valve seat 34, thereby closing the fluid path around the exterior of the diverter 38. This pressure differential is enhanced by the large surface area of the horizontal upper surface of the valve member as compared to the small surface area of the annulus of the lower surface of the valve member 42 facing into the main fluid passageway. So long as the pressure of the fluid at the inlet 30 is maintained the valve remains closed with a tight seal against the seat 34, so that the tank may not be filled with more fluid. As soon as the inlet pressure is released, by for example closing the external valve assembly, the pressure differential across the valve member 42 ceases and the spring 48 forces the valve member back into the open position. During operation of an appliance such as a burner connected to the tank, the external valve is opened. The internal pressure is now greater than the external, and this ensures that the valve member remains in its upward, open (FIG. 2) position whereby the fluid may be released from the tank.

Figure 4:
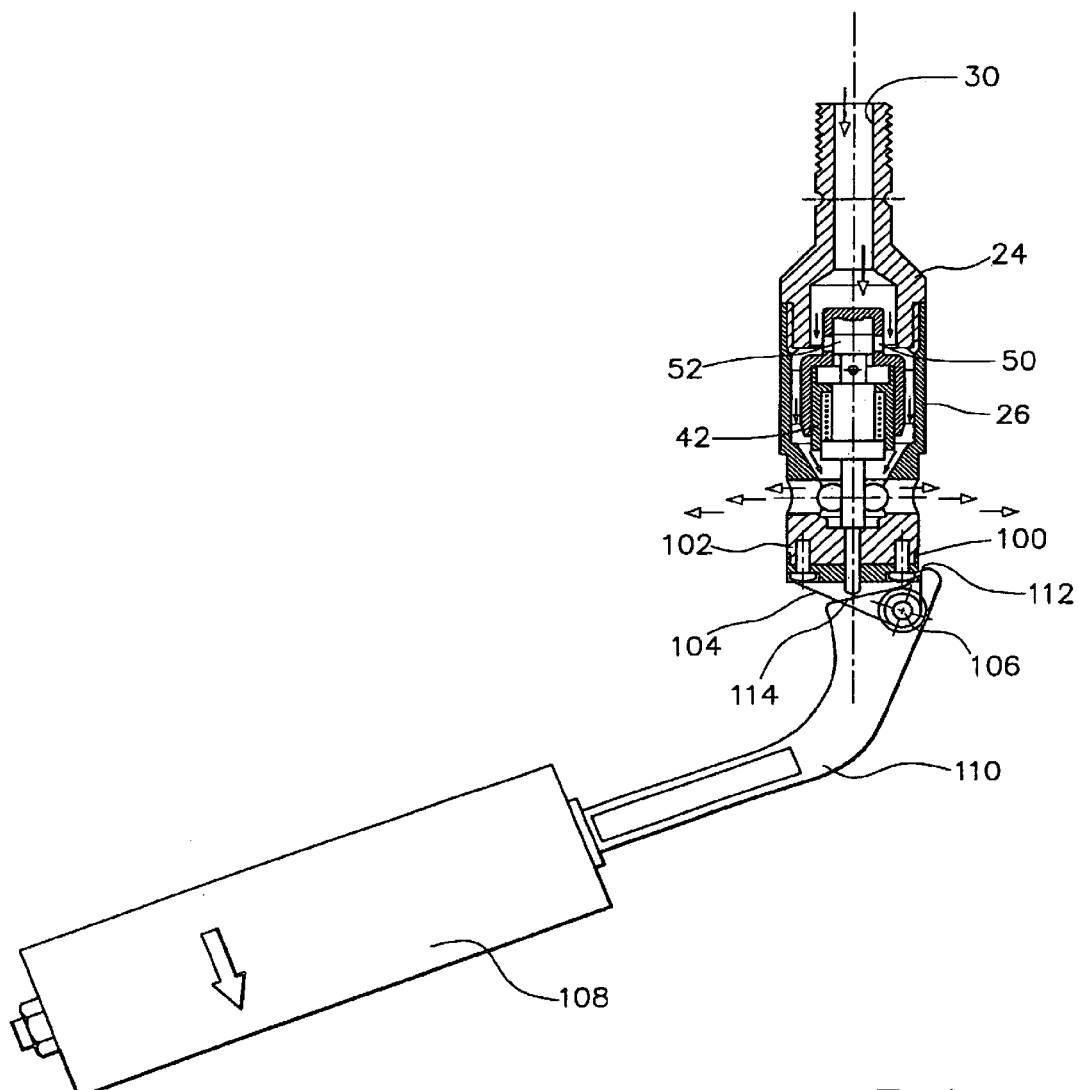
FIG. 4 is partial sectional side view of a further exemplary valve assembly according to a second embodiment of the invention and with the valve assembly open.
Figure 5:
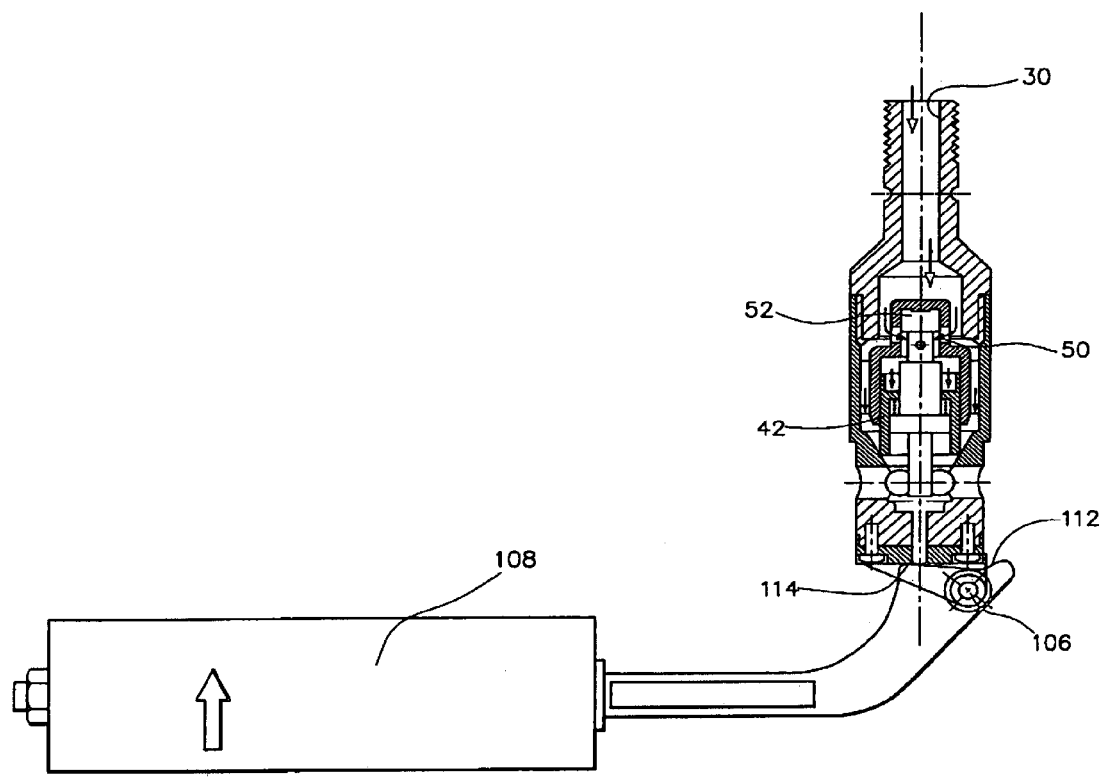
FIG. 5 is a partial sectional side view of the valve assembly of FIG. 4 with the valve assembly closed.

A second embodiment is illustrated in FIGS. 4 and 5 which is largely identical to the first embodiment (with like parts having like reference numerals) aside from the construction of the lower part of the lower housing and the float assembly. Instead of the vertical float assembly used in the first embodiment, the second embodiment is provided with a pivoting float. More particularly, the lower end of the lower housing part 26 is provided with an end plate 100 secured thereto by screws 102, the end plate having a pair of fingers 104 between which extends a lateral shaft 106 and on which the float 108 is supported through an arm 110. In the region of the arm 110 adjacent the pivot the arm is formed with a pair of actuating surfaces 112 and 114. In the empty condition of the tank the float 108 is in its lowermost position, the surface 112 abutting and end of plate 100 which prevents its rotation any further in an anti-clockwise sense. In this empty condition the control member is in its lowermost position, the valve member 42 is in its upper open position, and the secondary valve is closed, the secondary valve head 52 obscuring the openings 50. Pressurized fluid applied at the inlet 30 has an open path through the valve assembly, out of the openings into the tank. As the tank fills, the float 108 rises with the liquid level opening the secondary valve and closing the main fluid path with the valve member 42 urged tight against the valve seat, as indicated in FIG. 5.

Figure 7:
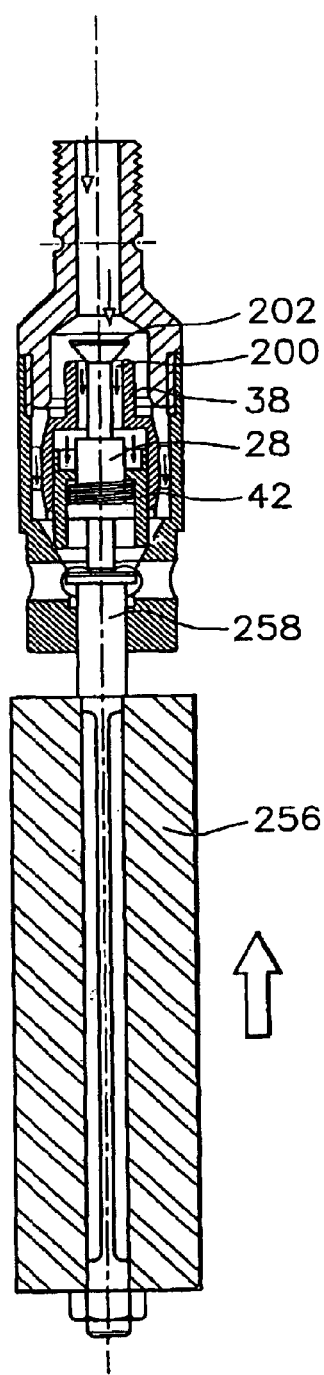
FIG. 7 is a partial sectional side view of the valve assembly of FIG. 6 with the valve assembly closed.
Figure 6:
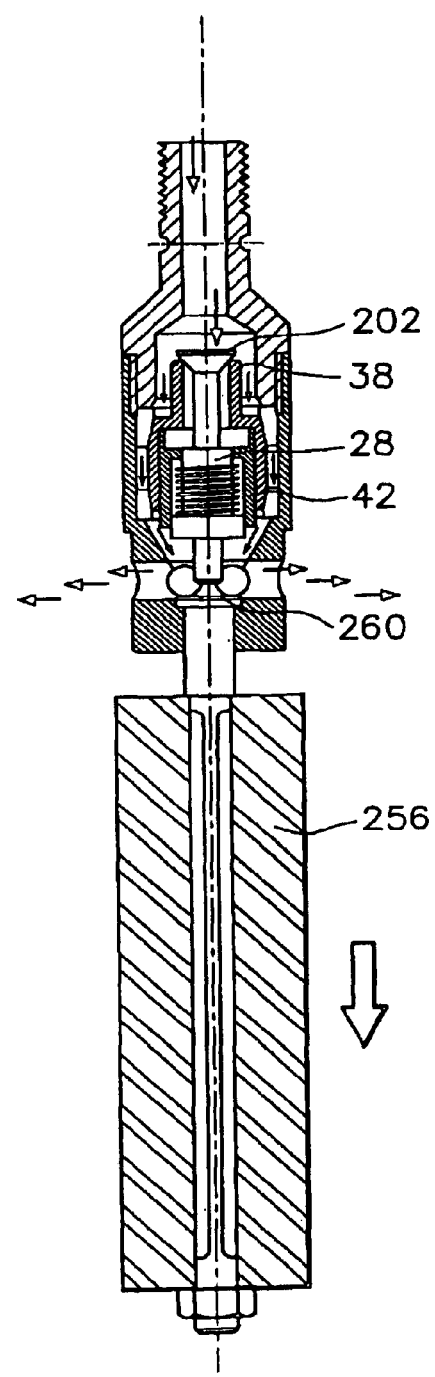
FIG. 6 is a partial sectional side view of a further exemplary valve assembly according to a third embodiment of the invention with the valve assembly open.

A third embodiment of the invention is illustrated in FIGS. 6 and 7. This embodiment is similar in construction to the first embodiment (with like parts indicated by like reference numerals) aside from the construction of the secondary valve and the float assembly. Here the upper portion of the diverter 38 is formed with an upwardly or upstream facing opening 200. A valve head 202 is joined to the top of the control member 28. In the lower position of the control member 28 the valve head 202 seals the opening 200, whereas in the upper position fluid can enter the opening 200. The float assembly comprises a float body 256 simply mounted on a float shaft 258 which makes a sliding fit within an axial bore, and having an enlarged head part 260 which constrains the float and serves as an actuating surface.

The operation is essentially the same as that of the first embodiment; in the empty or near-empty condition of FIG. 6 the spring 28 urges the valve member 42 up against the internal shoulder of the diverter 38 whereby the main fluid path is open, and urges the control member downwards, keeping the secondary valve closed with the valve 202 in the valve seat 200. As the tank fills to a predetermined level, the float forces the control member upwardly, opening the secondary valve whereby pressurized fluid impinges on the upper surface of valve member forcing it tight against the valve seat (FIG. 7). With this embodiment it will be appreciated that the pressurized fluid acts directly on the top face of the secondary valve thereby increasing the force of sealing, and thereby ensuring an especially tight seal. Any pulse of pressure, which might arise if the valve on a filling apparatus was suddenly opened would have the effect of increasing the seal effectiveness.

Figure 8:
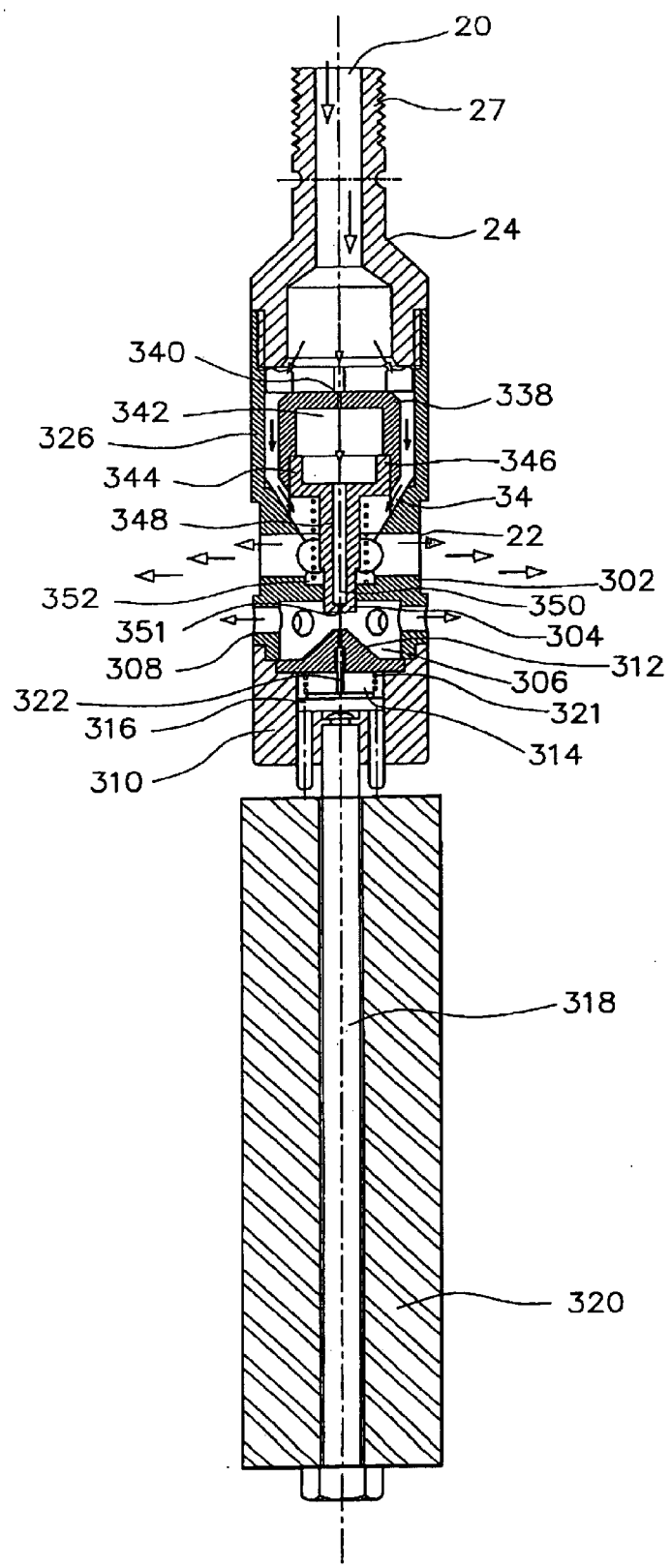
FIG. 8 is a partial sectional side view of a further exemplary valve assembly according to a fourth embodiment of the invention, with the valve assembly open.
Figure 10:
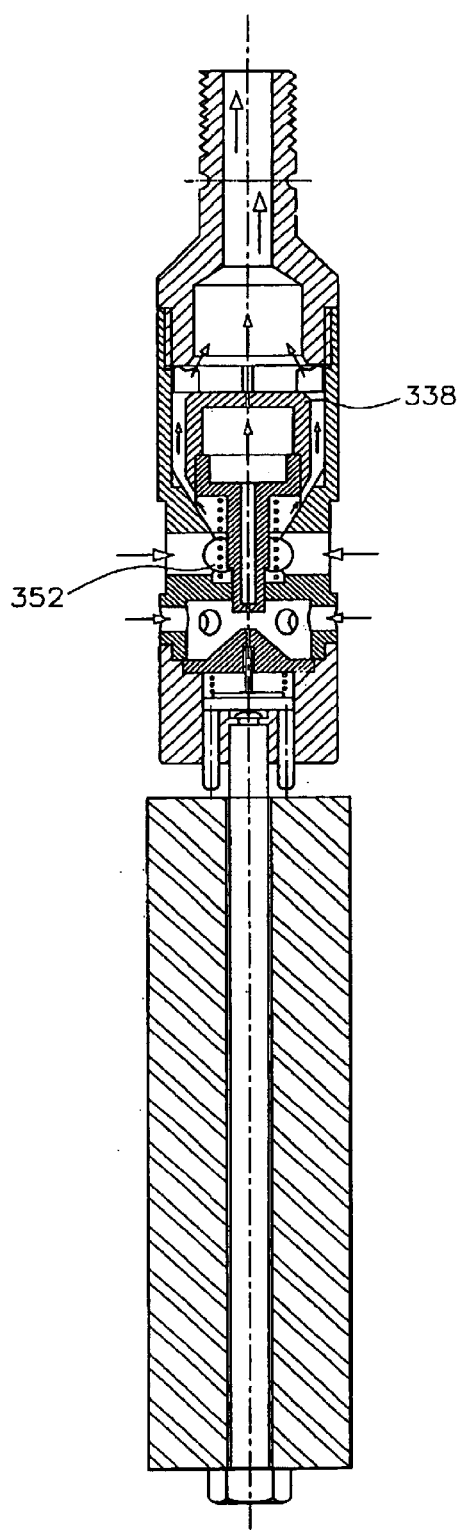
FIG. 10 is a partial sectional side view of the valve assembly of FIG. 8 with the valve assembly dispensing fluid.
Figure 9:
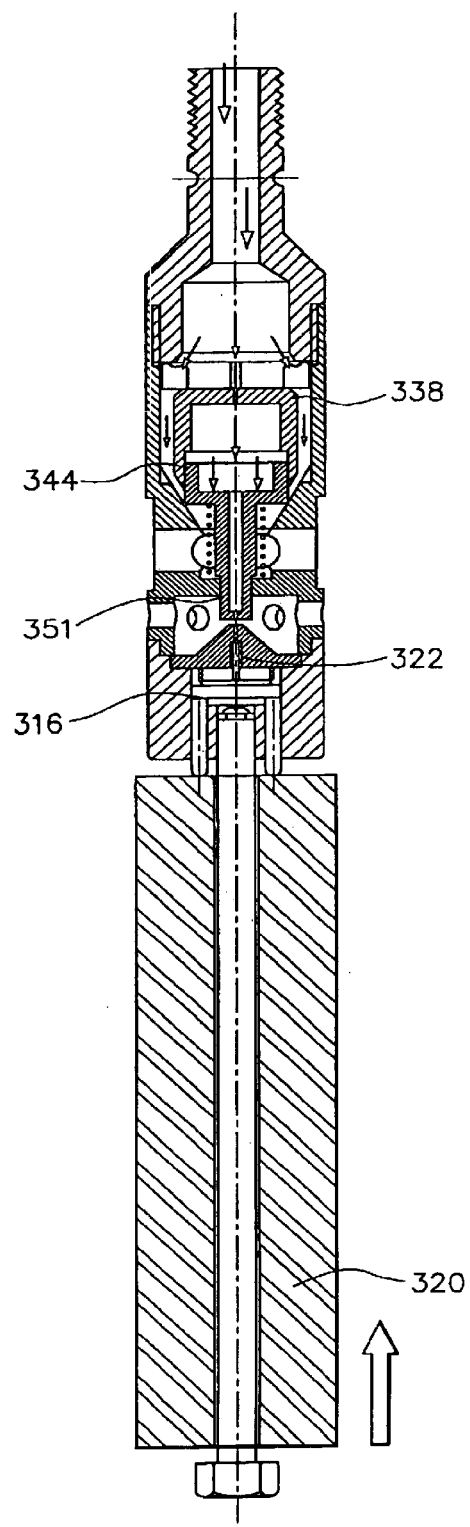
FIG. 9 is a partial sectional side view of the valve assembly of FIG. 8 with the valve assembly closed.

FIGS. 8 to 10 illustrate a fourth embodiment of the invention. Some of the parts are identical to the previous embodiments and indicated with identical reference numerals. Here, the upper housing part 24 is joined to a lower housing part 326 with the lower housing part defining not just ports 22 but having a further partition 302 extending across the lower housing part and defining an axial opening 304 therethrough. This opening communicates with a lower secondary chamber 306 having its own radially-extending ports 308 of smaller size than the main ports 22. An end cap 310 fitted to the lower housing part serves to support a float and a needle valve assembly as now described. A central upwardly conical guide member 312 is fitted within the end cap 310 facing up into the secondary chamber 306. This has an axial bore therethrough. Below this conical guide member 312 is an cylindrical cavity 314 within which a disc-like support member 316 is arranged. This supports on its underside float shaft 318 which carries float body 320. On its upper side the support member 316 supports the valve needle 322 which extends through the bore of the conical guide member 312. A spring 321 between the support 316 and conical guide member 312 provides a weak force to urge the float 310 downwardly.

As with the previous embodiments the main cylindrical interior cavity of the lower housing part is fitted with an insert which functions as a flow diverter. This diverter indicated 338 is, in contrast to the previous embodiments, provided with a small axially arranged bore 340 allowing inflowing fluid to reach the chamber 342 within the interior of the diverter. The main valve body indicated here 344 is also of a somewhat different form, having an upper cup-like portion seated in a cylindrical recess within the interior of the diverter 338 a lower periphery of which forms the sealing portion which engages the valve seat 34, and a depending tubular control stem defining an axial bore 350 which extends down through the partition 302 into the secondary cavity 306 forming part of a secondary fluid flow passageway. The opening 351 of this bore into the cavity 306 forms a secondary valve seat of the needle valve.

A main spring 352 is provided between a top face of the partition 302 and the underside of the cup-like portion 346 to urge the valve body 344 upwardly.

The operation of this valve will now be described. FIG. 8 shows the valve assembly in the empty or filling condition of tank, with the float 320 in its lowermost position. In this position the needle 322 of the needle valve assembly is in its lower position where the opening 351 is unobscured. The main valve body 344 is in its uppermost position whereby there is an unobscured main fluid flow passageway from the inlet 20 around the exterior of the diverter 338 through the valve seat 34 and out through the main ports 22.

There is a secondary flow path through the opening 340 in the top of the diverter 338 into the cavity 342, through the axial bore 350 into the secondary cavity 306 and exiting via the ports 308.

As the fluid level in the tank rises to a certain level, as indicated in FIG. 9 the float 320 rises, carrying the support 316 and its needle 322, the end of which extends into the opening 351 defining the needle valve seat thereby blocking this.

As the axial fluid flow is stopped a pressure differential is established over the main valve body 344. It will be apparent that a considerably larger area on the upper valve surface is exposed to the pressured fluid than on the lower edges facing the main path, whereby the main body 344 is urged downwardly against the action of the spring 352 so that the lower periphery of the cup-like portion is urged against the valve seat, blocking off the main fluid flow path whereby no fluid flows through the valve assembly. After shut-off of the valve assembly the user should manually close the external gate valve controlled by handle 12.

To release fluid from the tank the external gate valve is opened by turning the handle 12, thereby lowering the pressure at the upper side of the diverter 338 and main valve body 344 relative to the internal pressured fluid in the tank. The main value body 344 is urged up by the pressure differential and the force of the spring 352. The pressurized fluid thereby flows upwardly through both the main and secondary fluid flow paths, out through the main outlet port 10.

Figures 11, 12:
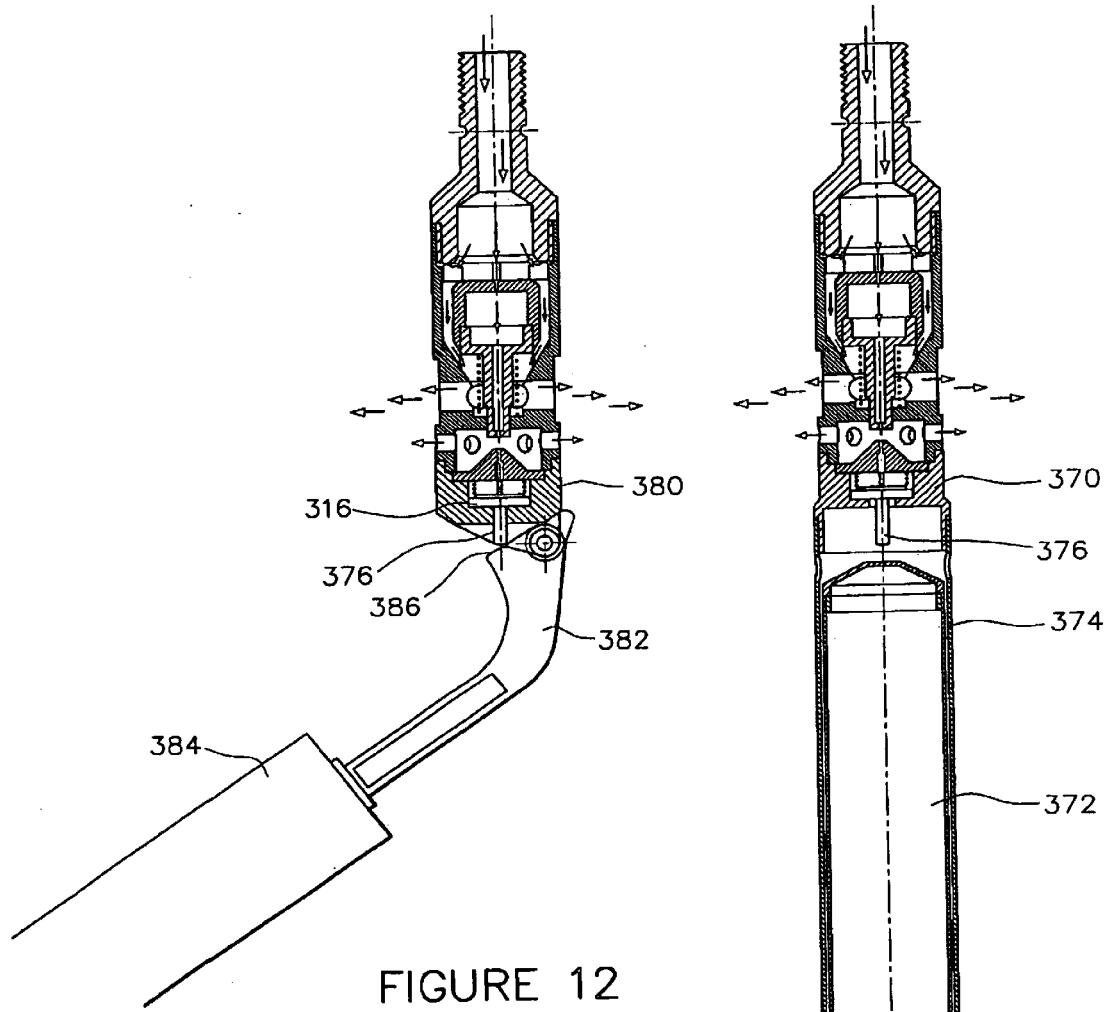
FIG. 11 is a partial sectional side view of a further exemplary valve assembly according to a fifth embodiment of the invention, with the valve assembly open.
FIG. 12 is a partial sectional side view of a further exemplary valve assembly according to a sixth embodiment of the invention, with the valve assembly open.

FIG. 11 illustrates a fifth embodiment of the invention which is identical to the fourth embodiment aside from the construction of the float assembly and associated lower part of the housing. This version employs a float having a similar form to the first embodiment. The end cap indicated 370 supports a sealed float member 372 within a float support 374. An upper end of the float member abuts a pin 376 depending from the support 316 as the fluid level in the tank rises.

The sixth embodiment shown in FIG. 12 is identical to the fourth and fifth embodiments aside from the construction of the float assembly and associated lower part of the housing. This version employs a pivoting float arm similar to the second embodiment. The end cap 380 is adapted to pivotably support a float arm 382 which carries a float 384. As in the fifth embodiment the needle support 316 has a depending pin 376. An actuating surface 386 of the float arm bears on the pin 376 as the float 384 rises with rising fluid level.

Both fifth and sixth embodiments operate in the same way as the fourth, with the movement of the floats controlling the needle valve which in turn controls the closure of the main valve as discussed above.

Figure 15:
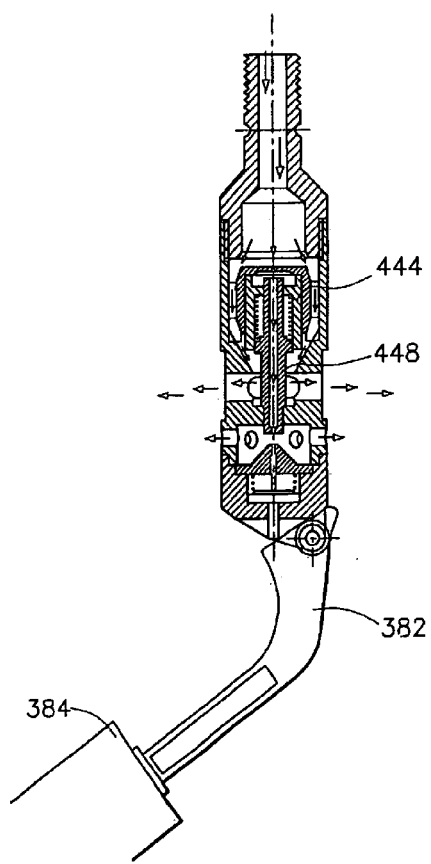
FIG. 15 is a partial sectional side view of a further exemplary valve assembly according to a ninth embodiment of the invention, with the valve assembly open.
Figure 14:
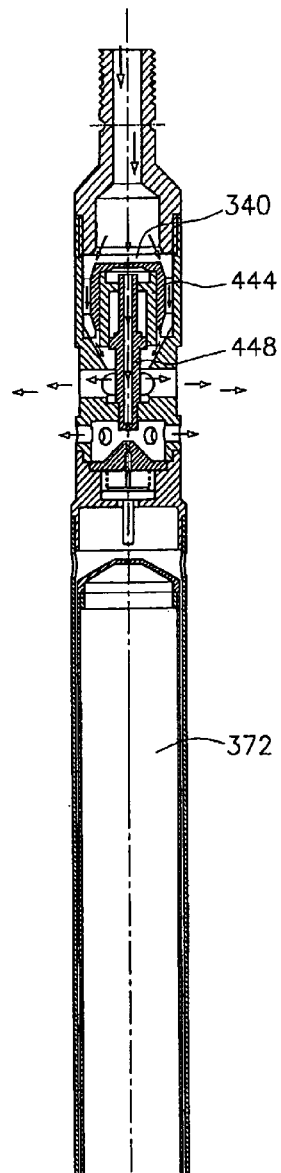
FIG. 14 is a partial sectional side view of a further exemplary valve assembly according to an eighth embodiment of the invention, with the valve assembly open.
Figure 13:
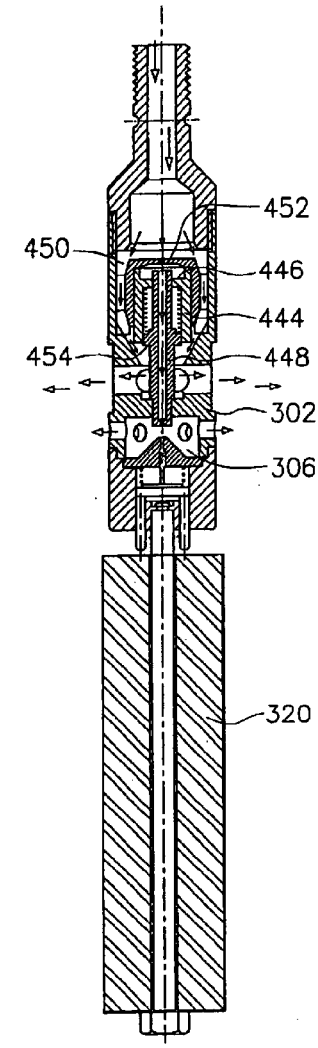
FIG. 13 a partial sectional side view of a further exemplary valve assembly according to a seventh embodiment of the invention, with the valve assembly open.

Seventh, eighth and ninth embodiments are shown in FIGS. 13, 14 and 15 respectively. These embodiments are identical to the fourth, fifth and sixth embodiments respectively aside from in the construction of the main valve body and its control stem and the diverter. Instead of a unitary construction the valve body 444 and secondary chamber conduit 448 of the embodiments are constructed in two parts. The valve body 444 consists of a generally inverted cup-like part with an upper web 446 extending thereacross. A short tubular portion 450 upstands from the top of the web 446. The valve body 444 is slidably received within the interior of the diverter, indicated 452, being movable to an uppermost position as shown in FIG. 13 where the top of the tubular portion abuts an edge region of the slightly domed underside of the diverter's top surface. The secondary chamber conduit 448 is fixed at its lower end to the partition 302, an upper end thereof extending through a central opening in the web 446 and a guide ring 454 is arranged approximately mid-way along the control stem being received within the lower mouth of the main valve body 444, thereby supporting the valve body 444. The secondary chamber conduit 448 provides, as before, for fluid communication between the interior of the diverter for the small amount of fluid which on filling enters through the small central opening 340 in the top surface of the diverter, leading this to the interior of the secondary chamber 306. The external surface of the diverter 452 is also of a slightly more rounded external shape to provide a smooth fluid flow through the main passageway. The operation of these embodiments is identical to that of the fourth, fifth and sixth, aside from the fact that secondary chamber conduit 448 is fixed with the main valve body 444 moving over it into the downward sealed position when the needle valve closes. The eight and ninth embodiments of FIGS. 14 and 15 are identical to the seventh aside from the construction of the float assembly which is identical to that of the fifth (FIG. 11) and sixth (FIG. 12) embodiments respectively.

Figure 18:
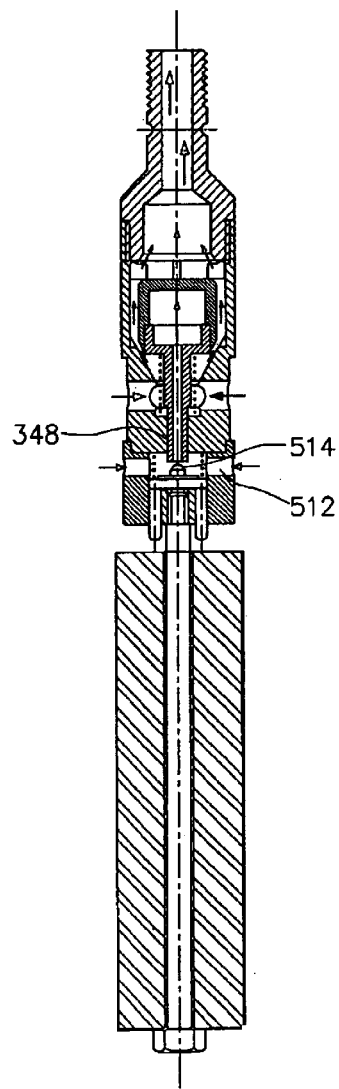
FIG. 18 is a partial sectional side view of the valve assembly of FIG. 16 with the valve assembly dispersing pressurized fluid.
Figure 17:
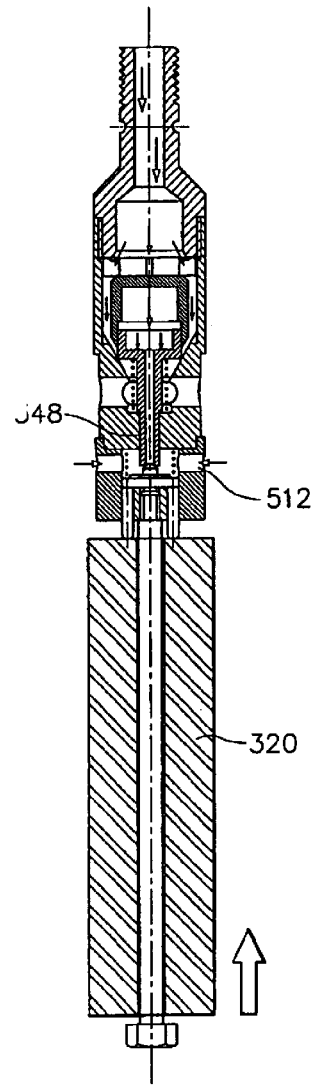
FIG. 17 is a partial sectional side view of the valve assembly of FIG. 16 with the valve assembly closed.
Figure 16:
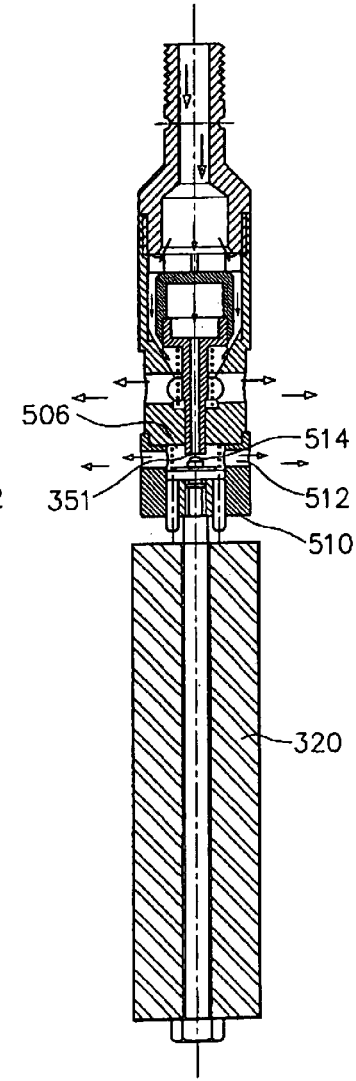
FIG. 16 is a partial sectional side view of a further exemplary valve assembly according to a tenth embodiment of the invention, with the valve assembly open.

A tenth embodiment is illustrated in FIGS. 16 to 18. This is identical to the fourth embodiment of FIGS. 8 to 10 aside from the construction of the lower housing part, the end cap and secondary valve.

Instead of a lower region of the lower housing part defining the secondary chamber and secondary ports, the secondary chamber 506 is here defined between a lower surface of the lower housing part and a cavity in the end cap 510. Ports 512 are defined in the end cap 510. The valve assembly, instead of a needle valve, comprises a broader pin 514 having an upper conical surface which can protrude into the lower opening 351 of the secondary chamber conduit 348 to seal this as the float 320 rises. FIG. 16 shows the assembly in a filling condition, whilst FIG. 17 shows the assembly when the liquid level in the tank has reached a predetermined level and the float level has risen sufficiently to block the secondary chamber conduit 348. As described above, the pressure differential which thereby forms across the valve body forces this down to close the main flow passageway. In contrast to the fourth embodiment, this downward movement will also serve to displace the float downwardly again by a very small distance. FIG. 18 shows the valve when the external tank valve is released and the pressurised fluid flows upwardly through both main and secondary flow paths.

Figure 20:
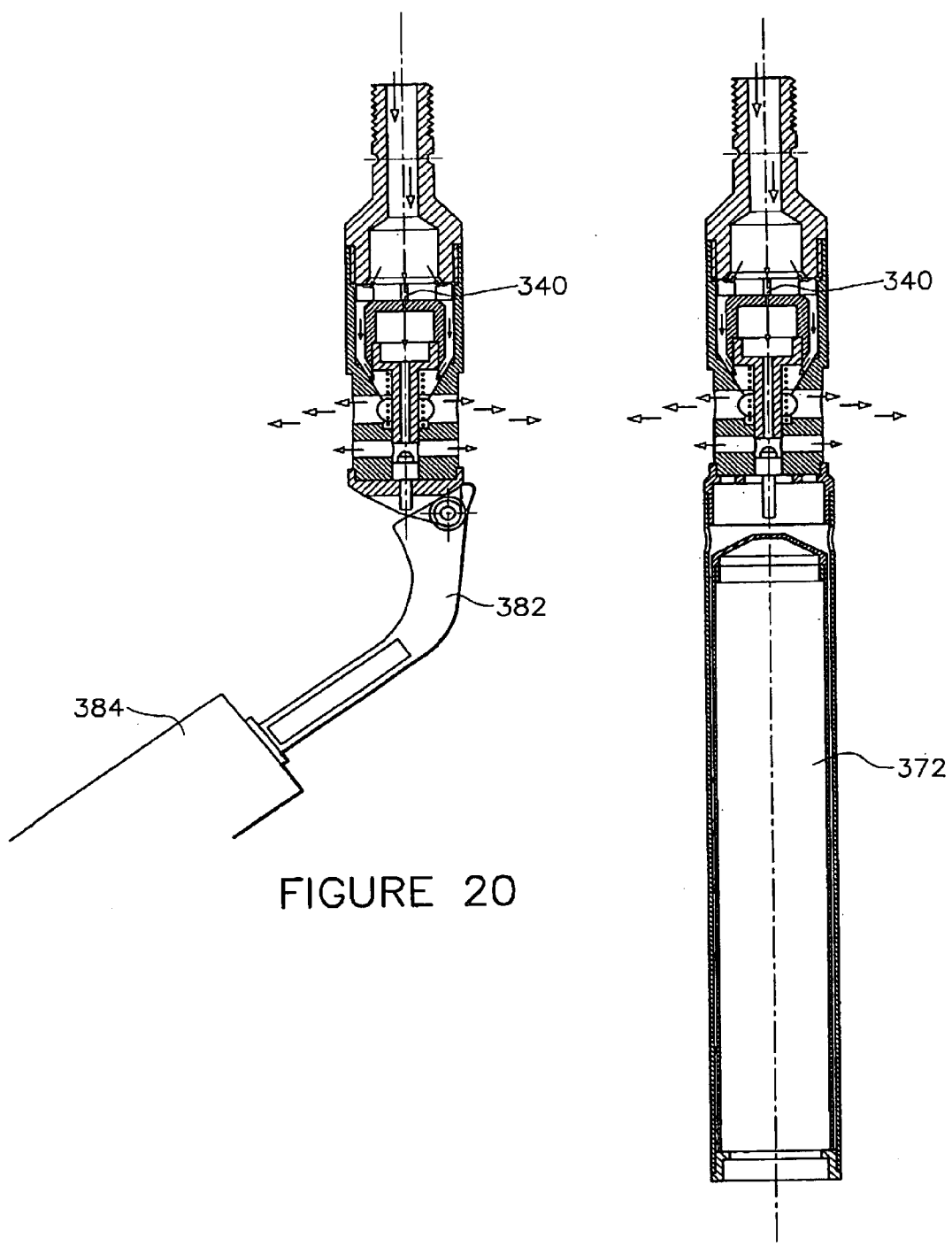
FIG. 20 is a partial sectional side view of a further exemplary valve assembly according to a twelfth embodiment of the invention, with the valve assembly open.

Eleventh and twelfth embodiments are illustrated in FIGS. 19 and 20 respectively, these figures showing the valves in the fluid filling positions with the floats in the lowermost positions. These embodiments are identical to the tenth embodiment of FIGS. 16 to 19 aside from the construction of the float valve assembly and adjacent parts of the end cap, which correspond essentially to those of the eighth and ninth embodiments of FIGS. 14 and 15 respectively.

Thirteenth, fourteenth and fifteenth embodiments are illustrated in FIGS. 21, 22 and 23 respectively each of these figures show the valves in the filling condition with the floats in their lowermost position. The thirteenth embodiment of FIG. 21 is identical to the embodiments of FIGS. 16 to 18 except that the unitary valve body and secondary chamber conduit is replaced by the two-part construction of the FIG. 13 embodiment with the secondary chamber conduit 448 fixed to the partition 302 and the valve body 444 moving over the conduit 448. The pin 514 moves up to block the opening of the conduit 448 on filling of the tank.

The fourteenth and fifteenth embodiments of FIGS. 22 and 23 are identical to the thirteenth embodiment of FIG. 21 except that the float assemblies and end cap constructions correspond to those of the embodiments of FIGS. 19 and 20 respectively.

Figure 24:
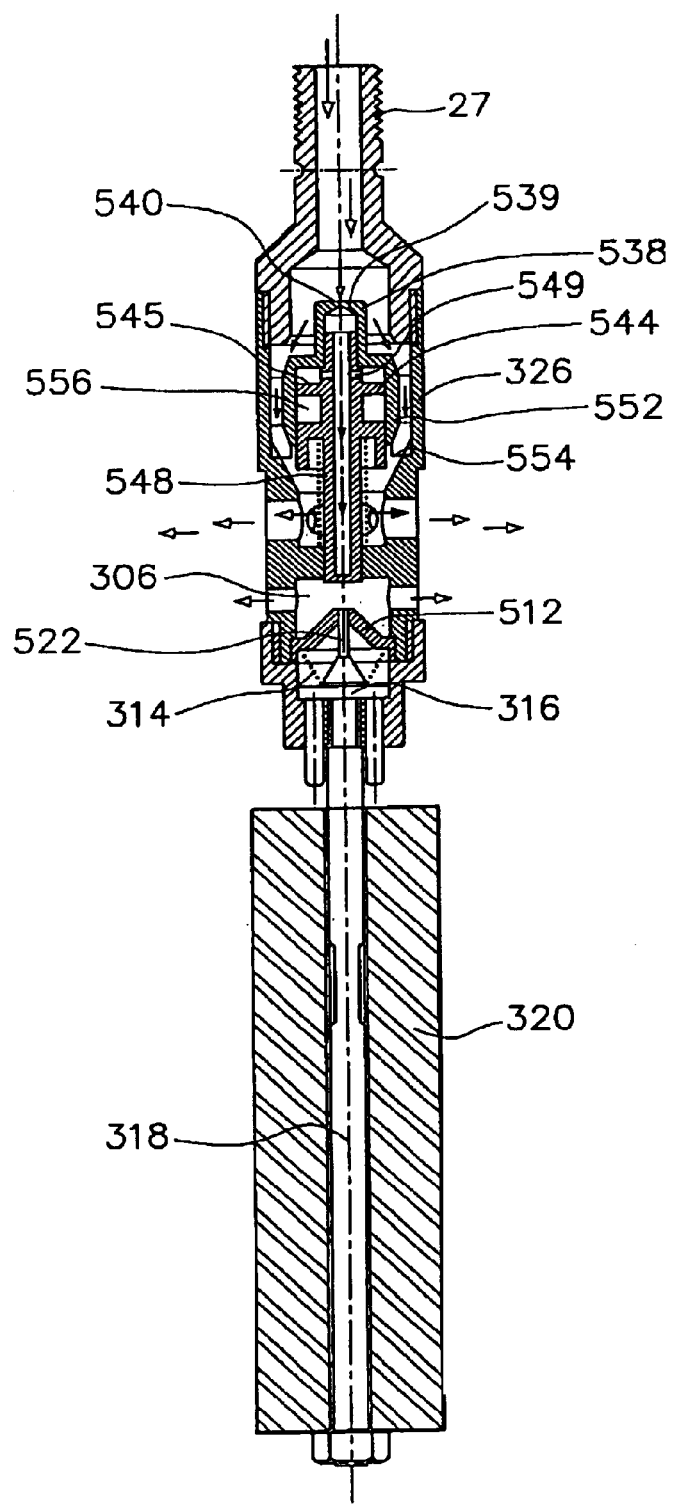
FIG. 24 is a partial sectional side view of a further exemplary valve assembly according to a sixteenth embodiment of the invention, with the valve assembly open.

A sixteenth embodiment is shown in FIG. 24. This version is generally similar to the fourth embodiment of FIGS. 8 to 10 the main difference being that the construction is such as to minimise the internal space which lies above the main valve member. More particularly, an insert 538 forms the flow diverter having an upper cap-like portion with an upper opening 540 centrally therein facing into the main fluid passageway. The main valve member 544 has an upper valve face 545. An axial conduit 548 extends from the valve face 545 through the main outlet chamber down to the secondary chamber 306. In addition, however, this conduit also extends upwardly into the cap-like top portion 539 of the insert 538. Radially extending openings 549 extend from the interior of the conduit to the upper surface of the valve face 545. Near the midpoint of the conduit 548 is a lateral web 552 from which depends a skirt portion 554 the lower periphery of which extends into the main fluid passageway and which contacts the valve seat on closure of the valve. Between the web 552 and the valve face 545 is an internal chamber 556. This chamber serves no purpose and might be infilled, although leaving a chamber is preferred in order to lighten the valve member. The return spring sits between the lower surface of the web 552 and a base of the main exit cavity.

The lower region of the assembly as illustrated has some minor constructional differences but is functionally the same as the FIG. 8 embodiment. Thus, a needle like member 522 extends through a guide 512.

In operation, when in the open filling position shown in FIG. 24, a major part of the pressurized fluid is flowing into the vessel by the main fluid passageway. A small amount of fluid passes through the upper small opening 540 through the conduit 548 to the secondary chamber and parts into the vessel. As before a rising fluid level in the vessel causes the float 320 the rise and at a predetermined level the needle 522 blocks the end of the conduit 548. The conduit rapidly fills with pressurized fluid, including passing via the openings 549 onto the upper valve member face 545 creating a pressure differential across the main valve member forcing it down against the valve seat. As before, a release of the external valve on the vessel the reversed pressure differential forces the main valve to open so the fluid flows out of the vessel. In this embodiment, the arrangement of the central conduit 548 leading fluid in the secondary flow path directly to the secondary chamber is particularly effective. The small volume of the conduit also means that on the predetermined level being reached it responds very rapidly to needle valve closure.

It will be appreciated that the float 320 may be replaced by a pivoting type as shown in FIGS. 4, 5, 12, 15, 20 23 or the enclosed type as shown in FIGS. 2, 3, 14, 19, 22.

Figure 25:
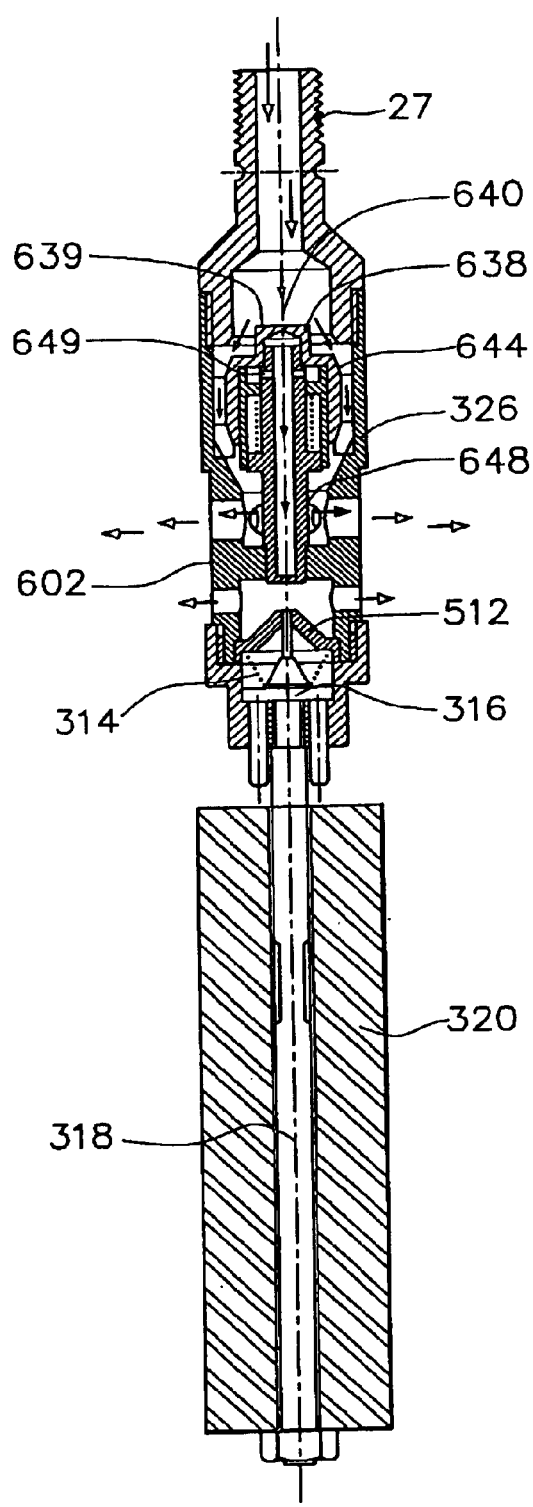
FIG. 25 is a partial sectional side view of a further exemplary valve assembly according to a seventeenth embodiment of the invention, with the valve assembly open.

A seventeenth embodiment is shown in FIG. 25. This embodiment is very similar to the seventh embodiment of FIG. 13. In similar manner to the sixteenth embodiment the insert, indicated 638, has an upper cap-like portion 639 in which a small axial hole 540 is provided facing into the main fluid passageway. In common with the seventh embodiment of FIG. 13 there is an axial conduit 648 which is fixed within the housing. This however is held at its upper end within the cap 639 interior, and at its lower end within an opening in the lateral partition 602. The valve body 644 has identical construction to the valve body of the seventh embodiment of FIG. 13. Radial openings 649 are provided near the upper end of the conduit leading to the upper face of the valve member 644. The lower needle valve assembly is identical to that of the sixteenth embodiment of FIG. 24 and will not be further described.

In operation, in the open position of FIG. 25 the major part of the fluid flows from the inlet through the main fluid passageway to the main outlet ports. A small secondary flow is through the opening 640, through the conduit 648 to the secondary outlet chamber and outlet ports. On filling of the vessel to the predetermined level, the needle valve closes whereby the narrow conduit 648 rapidly fills, with flow through the radial openings 649 to the upper face of the main valve member 644 creating a pressure differential across the main valve member 644 and forming its lower periphery against the valve seat, closing the valve. Release of the vessel external valve reverses the pressure differential across the main valve member 644 which opens to allow flow in the reverse direction.

It will be appreciated that the float 32 may be replaced by a pivoting type as shown in FIGS. 4, 5, 12, 15, 20 and 23 on the enclosed type of FIGS. 2, 3, 14, 19 and 22.

In a further development, the upper end of the conduit 648 and the inner surface of the cap-like part may be provided with a complementary screw fit, which facilitates assembly.

An eighteenth embodiment is shown in FIGS. 26 to 29. This embodiment is somewhat similar to that of FIGS. 8 to 10 in the construction of the main valve. More particularly, the valve assembly of this embodiment comprises a main housing having upper and lower housing parts 724,726 respectively, the upper housing part defining an upper threaded stem 727 and upper port 720. The housing parts 724, 726 are joined by complementary screw threads. The lower housing part 726 defines an internal cylindrical opening which includes a frustoconical surface which forms valve seat 734 communicating with radial ports 722. Located within the cylindrical interior cavity of the lower housing part 726 is an insert 738 which has the form of an inverted cup and which functions as a flow diverter. Its exterior is provided with a number of ribs 741 which serve to space the insert from 738 from the interior surface of the main internal cavity, and define main fluid flow paths therebetween. The insert 738 has a central opening 740 facing into the main fluid passageway.

Arranged within the internal cavity is the main valve body 742 which has a generally cup-like form with the upper rim slidingly disposed within the mouth of the insert 738 and the lower outer edge of the cup-shaped portion spaced from the insert 738 and constituting the portion of the valve body 742 which contacts the valve seat 734. The insert 738 and main valve body thereby define an internal chamber. Depending from the centre of the valve body 742 and communicating with the internal chamber is a conduit 748 with axial bore 750. This conduit 748 extends through an axial opening in an internal partition 702 extending across the lower part of the housing below the ports 722. A return spring 753 is disposed below the main valve around the conduit with the lower end against the partition 702. The lower end of the conduit 748 extends into a lower chamber defined by the partition 702 and an end cap 710. Secondary ports 712 in the end cap 710 communicate with the lower chamber. The lower region of the conduit 748 is formed with one or more openings 751 facing into the lower chamber. A secondary fluid flow passageway is thus defined from the opening 740 in the insert 738 through the internal chamber in the insert 738 via the conduit 748, through its opening(s) 751, the lower secondary chamber and out through ports 712 into the vessel.

The end cap 710 supports a float 721 in the form of a buoyant body through a stem 718. An upper end of the stem has a sleeve-like form 760 constituting a valve means for closing the openings 751 in the conduit. Arranged just above the openings 751 there is a shallow groove which supports a sealing O-ring 762. There is a further larger O-ring 764 arranged in the bottom of the lower chamber surrounding the stem 718. This is formed of a resilient material such as a rubber or an elastomer. A flange 766 extends outwardly from the stem 718 just below its uppermost end.

The operation of the valve is now described. In the open filling condition of FIG. 26 the float lies in its lowermost position. Incoming pressurized fluid flows in the upper valve port 720 around the insert 738, through the valve seat and out through the ports 722 into the vessel. A smaller amount of fluid flows through the secondary fluid flow path exiting through the ports 712 as described above and into the vessel.

Figure 28:
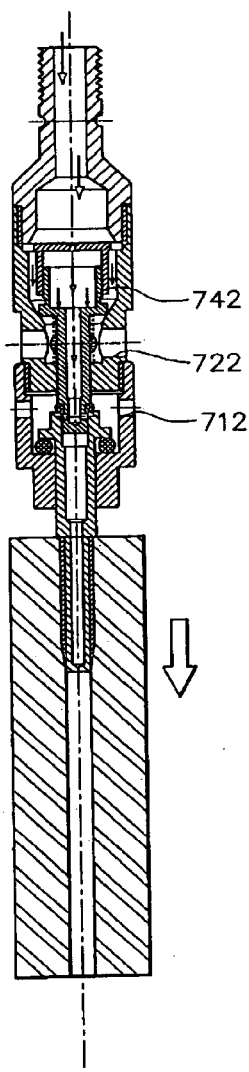
FIG. 28 is a partial sectional side view of the valve assembly of FIG. 26 with the valve assembly closed.
Figure 27:
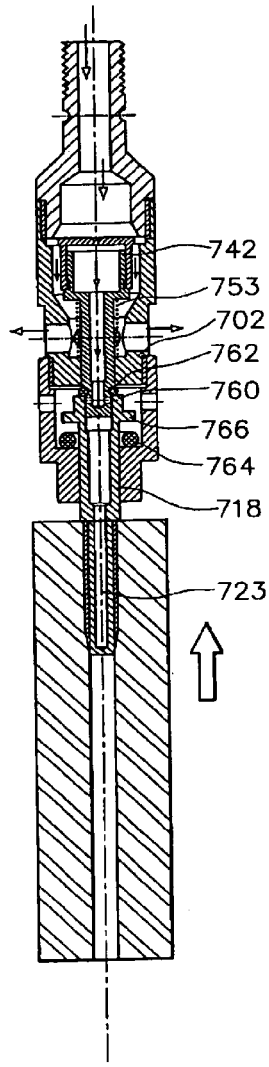
FIG. 27 is a partial sectional side view of the valve assembly of FIG. 26 with the valve assembly just starting to close, with the fluid level having reached the full condition.
Figure 26:
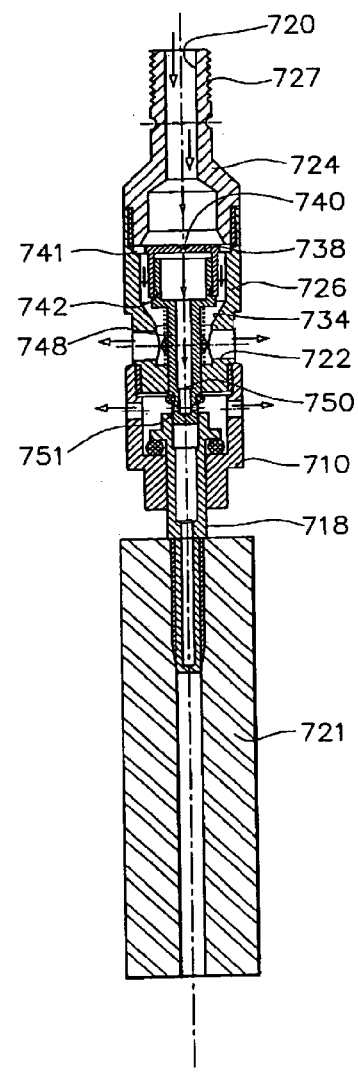
FIG. 26 is a partial sectional side view of a further exemplary valve assembly according to an eighteenth embodiment of the invention, with the valve assembly open.
Figure 29:
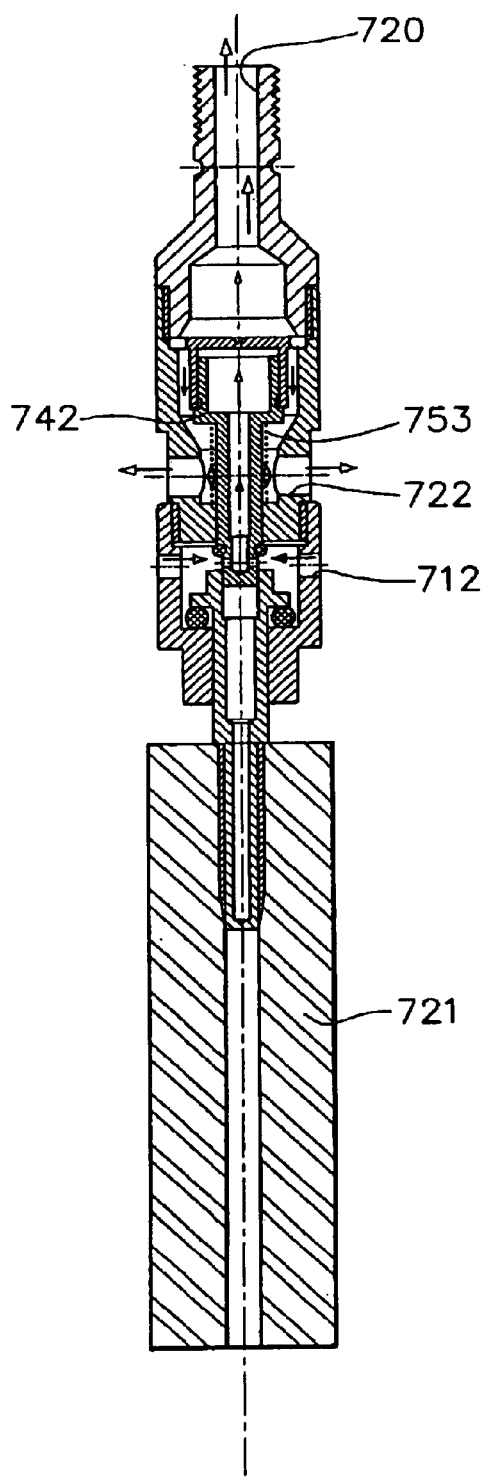
FIG. 29 is partial sectional side view of the valve assembly of FIG. 26 when dispensing fluid.

As the fluid level rises to a predetermined level the float is carried up, moving the sleeve 760 to obscure the openings 751 (FIG. 27). The secondary fluid flow path is thereby interrupted. This gives rise to a pressure differential across the main valve body, enhanced by the difference in surface area of the horizontal upper face of the valve body and the surface area of the horizontal annular region surrounding the conduit 748 which faces downwards into the main fluid flow passage. The main valve body 742 therefore moves down as indicated in FIG. 28 closing the main fluid flow passageway. This is the closed position of the valve assembly. The stem 718 and float 721 is forced down, the O-ring 762 abutting the top of the sleeve 760 and pushing it down to the position in FIG. 28 where the flange 766 also abuts the larger O-ring 764. The latter O-ring 764 has the primary purpose of providing a return force through its resilience forcing the upper end of the sleeve tightly against the sealing O-ring 762.

When the vessel's external gate valve (8 of FIG. 1) is released this lowers the pressure above the main valve body 742 whereby the main valve body 742 moves upwardly, aided by the return spring 753, opening the main fluid flow passage and secondary fluid flow passage so that fluid flows into the port 722 and a small amount into port 712 and up through the inlet 720. This is illustrated in FIG. 30.

It is also advantageously arranged that there is a small clearance between the end region of the conduit 748 and the sleeve 760. In practical terms it would be almost impossible to eliminate this clearance whilst still allowing smooth relative movement; however, the clearance is deliberately allowed so that a very small amount of leakage can occur in the secondary valve. This serves the purpose of providing a degree of pressure relief on closure of this valve, reducing the occurrence of a pulse of back pressure which can otherwise risk damage to upstream components such as a pressure meter. It will be noted that the stem 718 supporting the float 721 has a hollow interior 723 with a lower opening, as does the float 721, whereby any leaked fluid can claim into the vessel.

FIG. 30 shows a nineteenth embodiment which is identical to the eighteenth embodiment aside from the arrangement of the float. The float 821 here comprises a simple tubular member having a blind upper end. Air trapped in the float is used to provide the necessary buoyancy.

FIG. 31 shows a twentieth embodiment identical to the eighteenth and nineteenth aside from arrangement of the float and associated components. More particularly, the end cap 910 is provided with a pair of opposed fingers 914 which support a pivotably mounted float through a float arm 911. The control stem 918 abuts an actuating surface 915 on the arm so that as the float moves upwardly the sleeve 760 obscures the openings 751 causing the valve closure as discussed above.

What is claimed is:

1. A valve assembly for a pressurized fluid vessel comprising:
    a housing having a fluid inlet for connection, on filling, to a source of pressured fluid and a fluid outlet opening into the vessel, and defining a main fluid passageway therebetween;
    a main valve seat defined in said main fluid passageway;
    a main valve member movable against said valve seat to block the main fluid passageway;
    means defining a secondary fluid passageway from said main fluid passageway arranged so that an upstream side of the main valve member is exposed to fluid in the secondary fluid passageway;
    secondary valve means comprising a secondary valve opening and a secondary valve member arranged in said secondary fluid passageway movable to block the secondary fluid passageway; and
    control means responsive to a fluid level arranged to act on the secondary valve member to move this to a position on a predetermined vessel fluid level being reached in which the main valve member is exposed to a pressure differential to force the main valve member to contact the valve seat;
    wherein the means defining the secondary fluid passageway include chamber-defining means defining an internal chamber within the interior of the housing within which the upstream side of the main valve member is disposed; and
    wherein the valve member is generally in the form of an upturned cup having an upper face disposed within the chamber-defining member and exposed to pressurized fluid on opening of the secondary valve, and a depending skirt at least a lower region of which protrudes from the chamber-defining member into the main fluid passageway in the closed position.

2. A valve assembly according to claim 1 wherein the chamber defining means defines an opening from the main fluid passageway into the internal chamber which is closed by the secondary valve, said control means opening said secondary valve to expose the upstream side of the main valve member to pressured fluid on the predetermined vessel fluid level being reached.

3. A valve assembly according to claim 2 wherein the chamber defining means comprises a hollow body defining a lower cavity region within which the main valve member is slidingly received and an upper cavity region in which the secondary valve member is disposed.

4. A valve assembly according to claim 3 wherein the exterior of said hollow body defines with an interior surface within the housing said main fluid passageway.

5. A valve assembly according to claim 4 wherein the hollow body comprises an insert disposed within the housing and spaced from the interior surface by a plurality of ribs.

6. A valve assembly according to claim 1 wherein the control means comprises a control pin having an end region protruding from the valve assembly, in use acted on by float means, and an opposite end region to which said secondary valve member is connected.

7. A valve assembly according to claim 6 wherein a return spring provided to urge the main valve member into the open position spaced from the main valve seat.

8. A valve assembly according to claim 7 wherein the return spring is arranged between an underside of the upper region of the main valve member and a spring seat provided on the control pin.

9. A valve assembly according to claim 2 wherein said opening the secondary valve is disposed at an upper region of the chamber-defining means directly facing said housing inlet, and wherein the secondary valve member is disposed within the opening to be movable in the upstream direction, whereby the force of infilling pressurized fluid forces the secondary valve member into the opening.

10. A valve assembly for a pressurized fluid vessel comprising:
a housing having a fluid inlet for connection, on filling, to a source of pressured fluid and a fluid outlet opening into the vessel, and defining a main fluid passageway therebetween;
a main valve seat defined in said main fluid passageway;
a main valve member movable against said valve seat to block the main fluid passageway;
means defining a secondary fluid passageway from said main fluid passageway arranged so that an upstream side of the main valve member is exposed to fluid in the secondary fluid passageway;
secondary valve means comprising a secondary valve opening and a secondary valve member arranged in said secondary fluid passageway movable to block the secondary fluid passageway; and
control means responsive to a fluid level arranged to act on the secondary valve member to move this to a position on a predetermined vessel fluid level being reached in which the main valve member is exposed to a pressure differential to force the main valve member to contact the valve seat;
wherein the means defining the secondary fluid passageway include chamber-defining means defining an internal chamber within the interior of the housing within which the upstream side of the main valve member is disposed;
wherein the secondary fluid passageway is further defined extending from said internal chamber to a fluid outlet opening into the vessel, said secondary valve means being disposed in said secondary fluid passage between the internal chamber and the fluid outlet so as to block said secondary fluid passageway on the control means responding to said predetermined vessel fluid level; and
wherein the secondary fluid passageway is defined in a conduit arranged fixed within the housing, the main valve member having an opening therein through which the conduit extends, whereby the main valve member is slidable over the conduit.

11. A valve assembly for a pressurized fluid vessel comprising:
a housing having a fluid inlet for connection, on filling, to a source of pressured fluid and a fluid outlet opening into the vessel, and defining a main fluid passageway therebetween;
a main valve seat defined in said main fluid passageway;
a main valve member movable against said valve seat to block the main fluid passageway;
means defining a secondary fluid passageway from said main fluid passageway arranged so that an upstream side of the main valve member is exposed to fluid in the secondary fluid passageway;
secondary valve means comprising a secondary valve opening and a secondary valve member arranged in said secondary fluid passageway movable to block the secondary fluid passageway; and
control means responsive to a fluid level arranged to act on the secondary valve member to move this to a position on a predetermined vessel fluid level being reached in which the main valve member is exposed to a pressure differential to force the main valve member to contact the valve seat;
wherein the means defining the secondary fluid passageway include chamber-defining means defining an internal chamber within the interior of the housing within which the upstream side of the main valve member is disposed;
wherein the secondary fluid passageway is further defined extending from said internal chamber to a fluid outlet opening into the vessel, said secondary valve means being disposed in said secondary fluid passage between the internal chamber and the fluid outlet so as to block said secondary fluid passageway on the control means responding to said predetermined vessel fluid level; and
wherein the chamber-defining means comprises an inverted cup-like hollow body defining an opening in the upper surface facing into said main fluid passageway.

12. A valve assembly according to claim 11 wherein the main valve member comprises a cup-like member slidingly disposed within the mouth of the inverted cup-like body with a lower periphery extending into said main fluid passageway and abutting the valve seat in the closed position.

13. A valve assembly according to claim 12 wherein a return spring is provided between an underside of the main valve member and a spring seat within the housing, urging the main valve to the open position.

14. A valve assembly for a pressurized fluid vessel comprising:
a housing having a fluid inlet for connection, on filling, to a source of pressured fluid and a fluid outlet opening into the vessel, and defining a main fluid passageway therebetween;
a main valve seat defined in said main fluid passageway;

a main valve member movable against said valve seat to block the main fluid passageway;

means defining a secondary fluid passageway from said main fluid passageway arranged so that an upstream side of the main valve member is exposed to fluid in the secondary fluid passageway;

secondary valve means comprising a secondary valve opening and a secondary valve member arranged in said secondary fluid passageway movable to block the secondary fluid passageway; and control means responsive to a fluid level arranged to act on the secondary valve member to move this to a position on a predetermined vessel fluid level being reached in which the main valve member is exposed to a pressure differential to force the main valve member to contact the valve seat;

wherein the means defining the secondary fluid passageway include chamber-defining means defining an internal chamber within the interior of the housing within which the upstream side of the main valve member is disposed;

wherein the secondary fluid passageway is further defined extending from said internal chamber to a fluid outlet opening into the vessel, said secondary valve means being disposed in said secondary fluid passage between the internal chamber and the fluid outlet so as to block said secondary fluid passageway on the control means responding to said predetermined vessel fluid level;

wherein the secondary fluid passageway is in part defined in a conduit connected to or formed integrally with said main valve member; and wherein the said secondary valve openings are defined in said conduit and wherein the movable secondary valve member comprises a sleeve which overlies said conduit and is acted on or connected to said control means to obscure said secondary valve openings.

15. A valve assembly for a pressurized fluid vessel comprising:

a housing having a fluid inlet for connection, on filling, to a source of pressured fluid and a fluid outlet opening into the vessel, and defining a main fluid passageway therebetween;

a main valve seat defined in said main fluid passageway;

a main valve member movable against said valve seat to block the main fluid passageway;

means defining a secondary fluid passageway from said main fluid passageway arranged so that an upstream side of the main valve member is exposed to fluid in the secondary fluid passageway;

secondary valve means comprising a secondary valve opening and a secondary valve member arranged in said secondary fluid passageway movable to block the secondary fluid passageway; and control means responsive to a fluid level arranged to act on the secondary valve member to move this to a position on a predetermined vessel fluid level being reached in which the main valve member is exposed to a pressure differential to force the main valve member to contact the valve seat;

wherein the control means comprises a secondary valve support member which carries secondary valve member, the support member being slidingly mounted near a lower end of the housing and to which is connected float means which urges the valve support member upwardly as the vessel fluid level rises, the secondary valve support member being downwardly biased by further spring means.

16. A valve according to claim 15 wherein the means defining the secondary fluid passageway include chamber-defining means defining an internal chamber within the interior of the housing within which the upstream side of the main valve member is disposed.

17. A valve assembly according to claim 15 further comprising a float member supported on the valve assembly and having an actuating surface which acts on the control means.

18. A valve assembly according to claim 17 wherein the float member is of elongate form disposed in a vertical orientation and mounted to allow vertical displacement.

19. A valve assembly according to claim 17 wherein the float member is of elongate form and is mounted on a pivoting arm so as to pivot between a generally vertical orientation in an empty condition of the vessel and a horizontal or inclined orientation in a full condition of the vessel, the pivoting arm having an actuating surface which engages the control means on filling.

20. A valve assembly according to claim 16 wherein the secondary fluid passageway is further defined extending from said internal chamber to a fluid outlet opening into the vessel, said secondary valve means being disposed in said secondary fluid passage between the internal chamber and the fluid outlet so as to block said secondary fluid passageway on the control means responding to said predetermined vessel fluid level.

21. A valve assembly according to claim 20 wherein the secondary fluid passageway is in part defined in a conduit connected to or formed integrally with said main valve member.

22. A valve assembly according to claim 21 wherein the said conduit extends to a secondary exit chamber from which fluid exits the assembly via one or more further ports.

23. A valve assembly according to claim 21 wherein the secondary valve means comprises a needle valve having a needle-like member supported on the control means which is receivable within a valve seat within said conduit.

24. A valve assembly for a pressurized fluid vessel comprising:

a housing having a fluid inlet for connection, on filling, to a source of pressured fluid and a fluid outlet opening into the vessel, and defining a main fluid passageway therebetween;

a main valve seat defined in said main fluid passageway;

a main valve member movable against said valve seat to block the main fluid passageway;

means defining a secondary fluid passageway from said main fluid passageway arranged so that an upstream side of the main valve member is exposed to fluid in the secondary fluid passageway:

secondary valve means comprising a secondary valve opening and a secondary valve member arranged in said secondary fluid passageway movable to block the secondary fluid passageway; and control means responsive to a fluid level arranged to act on the secondary valve member to move this to a position on a predetermined vessel fluid level being reached in which the main valve member is exposed to a pressure differential to force the main valve member to contact the valve seat;

wherein the means defining the secondary fluid passageway include chamber-defining means defining an internal chamber within the interior of the housing within which the upstream side of the main valve member is disposed; and wherein said chamber-defining means defines an enclosure having an upper portion of reduced lateral dimension defining an opening into the main fluid passageway and below this a portion of enlarged lateral dimension within which the main valve member is disposed.

25. A valve assembly according to claim 24 wherein said secondary flow path is further defined within a conduit which extends from said upper portion and which includes an outlet or outlets adjacent the upper side of the main valve members.

26. A valve assembly according to claim 25 wherein said conduit extends through the valve member and is joined thereto or formed unitarily therewith.

27. A valve assembly according to claim 26 wherein the valve member has a depending skirt portion that abuts the valve seat in the closed position.

28. A valve assembly according to claim 25 wherein said conduit fixed within the housing, the valve member defining an opening through which the conduit extends, whereby the main valve member is slidable over the conduit.

29. A valve assembly according to claim 25 where the upper end the conduit is formed with screw means for screwing into a complementary female screw thread within said upper portion.

30. A valve assembly for a pressurized fluid vessel comprising:

a housing having a fluid inlet for connection, on filling, to a source of pressured fluid and a fluid outlet opening into the vessel, and defining a main fluid passageway therebetween;

a main valve seat defined in said main fluid passageway;

a main valve member movable against said valve seat to block the main fluid passageway;

means defining a secondary fluid passageway from said main fluid passageway arranged so that an upstream side of the main valve member is exposed to fluid in the secondary fluid passageway;

secondary valve means comprising a secondary valve seat and a secondary valve member arranged in said secondary fluid passageway movable to block the secondary fluid passageway; and control means responsive to a fluid level arranged to act on the secondary valve member to block the secondary fluid passageway on a predetermined vessel fluid level being reached to thereby expose the main valve member to a pressure differential forcing it against the valve seat;

wherein the said means defining the secondary fluid passageway includes a body defining an opening therein communicating with said main passageway and further defining with said main valve member or with means connected to said main valve member an internal chamber; and wherein the said body defining the opening therein has the form of an inverted cup, with said main valve member having a cup-like form with an upper edge slidingly received within said body.

31. A valve assembly according to claim 30 wherein a conduit depends from said main valve member communicating with said internal chamber and constituting part of said second passageway.

32. A valve assembly according to claim 31 wherein the conduit has at least one opening at a lower region thereof constituting said secondary valve opening.

33. A valve assembly according to claim 32 wherein the control means includes a sleeve portion which overlies the lower region of the conduit and is movable to block said opening or openings.

34. A valve assembly according to claim 33 wherein the control means comprises a connecting rod connected to the sleeve portion, and in use acted on by float means.

35. A valve assembly according to claim 33 wherein a small clearance is provided between the sleeve portion and conduit whereby a small amount of fluid leakage is allowed to occur therebetween.

36. A valve assembly according to claim 34 wherein the connecting rod comprises a hollow tube.

37. A valve assembly according to claim 33 wherein a sealing ring provided about the conduit above the said opening or openings against which an end of the sleeve abuts when the main valve is closed.

38. A valve assembly according to claim 35 wherein resilient means are provided against which an adaptation on the conduit bears when the valve is in the closed position, providing an upward force on the sleeve to force it tightly against the sealing ring.

39. A valve assembly for a pressurized fluid vessel comprising:

a housing having a fluid inlet for connection, on filling, to a source of pressured fluid and a fluid outlet opening into the vessel, and defining a main fluid passageway therebetween;

a main valve seat defined in said main fluid passageway;

a main valve member disposed upstream of the valve seat movable against said valve seat to block the main fluid passageway;

a return spring provided to urge the main valve member out of the main valve seat;

means defining a secondary fluid passageway from said main fluid passageway arranged so that an upstream side of the main valve member is exposed to fluid in the secondary fluid passageway;

secondary valve means comprising a secondary valve seat and a secondary valve member arranged in said secondary fluid passageway movable to block the secondary fluid passageway; and control means responsive to a fluid level arranged to act on the secondary valve member to block the secondary fluid passageway on a predetermined vessel fluid level being reached to thereby expose the main valve member to a pressure differential forcing it in the direction of flow in the secondary fluid passageway against the valve seat.

40. A valve assembly according to claim 39 wherein the said means defining the secondary fluid passageway includes a body defining an opening therein communicating with said main passageway and further defining with said main valve member or with means connected to said main valve member an internal chamber.

41. A valve according to claim 39 wherein the means defining the secondary fluid passageway include chamber-defining means defining an internal chamber within the interior of the housing within which the upstream side of the main valve member is disposed.

42. A valve assembly according to claim 41 wherein the chamber defining means defines an opening from the main fluid passageway into the internal chamber which is closed by the secondary valve, said control means opening said secondary valve to expose the upstream side of the main valve member to pressured fluid on the predetermined vessel fluid level being reached.

43. A valve assembly according to claim 42 wherein the chamber defining means comprises a hollow body defining a lower cavity region within which the main valve member is slidingly received and an upper cavity region in which the secondary valve member is disposed.

44. A valve assembly according to claim 43 wherein the exterior of said hollow body defines with an interior surface within the housing said main fluid passageway.

45. A valve assembly according to claim 44 wherein the hollow body comprises an insert disposed within the housing and spaced from the interior surface by a plurality of ribs.

46. A valve assembly according to claim 39 wherein the control means comprises a control pin having an end region protruding from the valve assembly, in use acted on by float means, and an opposite end region to which said secondary valve member is connected.

47. A valve assembly according to claim 39 wherein the return spring is arranged between an underside of the upper region of the main valve member and a spring seat provided on the control pin.

48. A valve assembly according to claim 42 wherein said opening the secondary valve is disposed at an upper region of the chamber-defining means directly facing said housing inlet, and wherein the secondary valve member is disposed within the opening to be movable in the upstream direction, whereby the force of infilling pressurized fluid forces the secondary valve member into the opening.

49. A valve assembly according to claim 39 further comprising a float member supported on the valve assembly and having an actuating surface which acts on the control means.

50. A valve assembly according to claim 49 wherein the float member is of elongate form disposed in a vertical orientation and mounted to allow vertical displacement.

51. A valve assembly according to claim 49 wherein the float member is of elongate form and is mounted on a pivoting arm so as to pivot between a generally vertical orientation in an empty condition of the vessel and a horizontal or inclined orientation in a full condition of the vessel, the pivoting arm having an actuating surface which engages the control means on filling.

52. A valve assembly according to claim 41 wherein the secondary fluid passageway is further defined extending from said internal chamber to a fluid outlet opening into the vessel, said secondary valve means being disposed in said secondary fluid passage between the internal chamber and the fluid outlet so as to block said secondary fluid passageway on the control means responding to said predetermined vessel fluid level.

53. A valve assembly according to claim 52 wherein the secondary fluid passageway is in part defined in a conduit connected to or formed integrally with said main valve member.

54. A valve assembly according to claim 53 where the said conduit extends to a secondary exit chamber from which fluid exits the assembly via one or more further ports.

55. A valve assembly according to claim 53 wherein the secondary valve means comprises a needle valve having a needle-like member supported on the control means which is receivable within a valve seat within said conduit.

* * * * *